United States Patent
Hong (10) Patent No.: US 11,028,215 B2
(45) Date of Patent: Jun. 8, 2021

(54) DOPANT-FREE CONDUCTIVE BIOELASTOMERS

(71) Applicant: BOARD OF REGENTS, THE UNIVERSITY OF TEXAS SYSTEM, Austin, TX (US)

(72) Inventor: Yi Hong, Irving, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 265 days.

(21) Appl. No.: 16/073,229

(22) PCT Filed: Feb. 15, 2017

(86) PCT No.: PCT/US2017/017925
§ 371 (c)(1),
(2) Date: Jul. 26, 2018

(87) PCT Pub. No.: WO2017/142918
PCT Pub. Date: Aug. 24, 2017

(65) Prior Publication Data
US 2019/0031813 A1    Jan. 31, 2019

Related U.S. Application Data

(60) Provisional application No. 62/295,442, filed on Feb. 15, 2016.

(51) Int. Cl.
| | | |
|---|---|---|
| C08G 18/12 | (2006.01) | |
| C08G 18/32 | (2006.01) | |
| C08G 18/34 | (2006.01) | |
| C08G 18/38 | (2006.01) | |
| C08G 18/73 | (2006.01) | |
| C08G 18/66 | (2006.01) | |
| C08G 18/42 | (2006.01) | |
| C08G 18/08 | (2006.01) | |
| C08G 18/24 | (2006.01) | |
| C08G 18/77 | (2006.01) | |

(52) U.S. Cl.
CPC ....... *C08G 18/348* (2013.01); *C08G 18/0823* (2013.01); *C08G 18/244* (2013.01); *C08G 18/4277* (2013.01); *C08G 18/6659* (2013.01); *C08G 18/73* (2013.01); *C08G 18/771* (2013.01); *C08G 2230/00* (2013.01)

(58) Field of Classification Search
None
See application file for complete search history.

(56) References Cited

U.S. PATENT DOCUMENTS

2015/0032137 A1    1/2015   Wagner et al.

FOREIGN PATENT DOCUMENTS

| CN | 104311775 A | * | 1/2015 | ......... C08G 18/0823 |
|---|---|---|---|---|
| CN | 104974705 A |   | 10/2015 | |
| WO | WO-2005/117030 A2 |   | 12/2005 | |

OTHER PUBLICATIONS

Machine translation of CN-104311775-A (no date).*
Chen, Jing et al; "Biocompatible, Biodegradable, and Electroactive Polyurethane-Urea Elastomers with Tunable Hydrophilicity for Skeletal Muscle Tissue Engineering"; ACS Applied Materials & Interfaces; vol. 7 No. 51; Dec. 7, 2015; pp. 28273-28285.
Chen, Jing et al.; "Super Stretchable Electroactive Elastomer Formation Driven by Aniline Trimer Self-Assembly"; Chemistry of Materials; vol. 27 No. 16; Aug. 25, 2015; pp. 5668-5677.
International Search Report for PCT/US2017/017925; authorized officer Lee W. Young; dated May 25, 2017; 2 pages.

* cited by examiner

Primary Examiner — Michael J Feely
(74) Attorney, Agent, or Firm — Winstead PC (57) ABSTRACT

The present invention provides dopant-free conductive elastomeric polyurethanes that have broad biomedical application, including smart drug delivery, electronics and biomedicine. In various embodiments, a dopant-free conductive, elastomeric polyurethane is designed by covalently conjugating biodegradable segment, conductive segment and dopant molecule into one polymer chain. The dopant-free conductive polyurethanes according to various embodiments of the invention exhibit attractive mechanical properties, including bending, knotting, stretching and recoiling. The biodegradable, conductive elastomer also exhibit good electroactivity and electrical stability without extra dopant involvement.

20 Claims, 8 Drawing Sheets

| Samples | Molar ratio of PCL:DMPA: HDI:trimer | Tg (°C) | Tm (°C) | Water absorption (%) | Inherent viscosity (dL/g) | Conductivity (S/cm) Dry state | Conductivity (S/cm) Wet state | Tensile strength (MPa) | Initial modulus (MPa) | Breaking strain (%) | Instant recovery (%) |
|---|---|---|---|---|---|---|---|---|---|---|---|
| PU-trimer | 1:0:2:1 | −60 | 32 | 6±2a | 2.54 | 2.7±0.9×10$^{-10}$ | 4.2±0.5×10$^{-8}$ | 17.9±2.0a | 7.2±0.8a | 728±88 | 99±1 |
| DCPU-0.1/1 | 0.9:0.1:1:1 | −61 | 29 | 8±1b | 2.32 | 5.5±0.7×10$^{-8}$ | 4.4±0.4×10$^{-7}$ | 12.6±2.3b | 5.2±1.1b | 695±96 | 100±2 |
| DCPU-0.2/1 | 0.8:0.2:2:1 | −62 | 28 | 9±1c | 1.37 | 4.6±0.4×10$^{-7}$ | 2.1±0.3×10$^{-5}$ | 10.9±1.5b | 3.6±0.4c | 825±198 | 99±1 |
| DCPU-0.3/1 | 0.7:0.3:2:1 | −67 | 24 | 15±2d | 1.20 | 1.2±0.3×10$^{-5}$ | 4.7±0.8×10$^{-3}$ | 9.6±1.2c | 3.0±0.6c | 695±104 | 99±1 |
| PU-COOH | 0.7:0.3:2:0 | −64 | 30 | 19±2e | 1.23 | 0 | 9.7±0.4×10$^{-8}$ | 20.3±5.3a | 16.5±3.1d | 839±275 | 99±1 |

*a,b,c,d,e represent significantly different groups for each characteristic; #Chain extender is putrescine in PU-COOH.

Table 1. Polymer film characterization*

FIG. 10

DOPANT-FREE CONDUCTIVE BIOELASTOMERS

CROSS REFERENCE TO RELATED APPLICATIONS

This application claims priority to U.S. provisional patent application No. 62/295,442, filed on 15 Feb. 2016 to Yi Hong, entitled; "Dopant-Free Conductive Bioelastomers", incorporated herein by reference of its entirety.

GOVERNMENT RIGHTS

Development of the inventions described herein was at least partially funded with government support through Research Enhancement Program of the University of Texas at Arlington, and the Faculty Early Career Development (CAREER) award #1554835 from the National Science Foundation in the United States of America and the U.S. government has certain rights in the inventions.

FIELD OF THE INVENTION

The present invention relates generally to the field of dopant-free conductive bioelastomers. In particular, the invention pertains to materials and methods of making dopant-free conductive elastomeric polyurethanes that have broad biomedical applicability, including in the fields of smart drug delivery, electronics and biomedicine.

BACKGROUND

Conductive biomaterials, including conductive composites and polymers, have gained increasing interest in biomedical applications, such as electrically controlled drug release, cell and tissue engineering, biosensors, and bioactuators. The conductive composites contain biodegradable polymers (e.g. polylactide, polycaprolactone, and polyurethane) and organic conductive polymers (e.g. polyaniline, polypyrrole, and poly(3,4-ethylenedioxythiophene)) or inorganic additives (e.g. carbon nanotubes, graphene, gold nanowire), in which the biodegradable polymers provide mechanical behavior and the additives provide electric conductivity. The biodegradable conductive polymers are synthesized through conjugating conductive segments with biodegradable polymers, such as polylactide (PLA)-aniline pentamer (AP)-polylactide (PLA-AP-PLA), poly pyrrole-co-polycaprolactone (PPy-PCL), and hyperbranched ductile polylactide (HPLA)-co-aniline tetramer (AT) (HPLAAT), which require mixing with dopants for conductivity.

However, for tissue repair and regeneration use, there are major concerns about these aforementioned conductive biomaterials. The conductive additives in the composites are nondegradable, which may induce chronic inflammation and infection in vivo. Furthermore, a dopant is required for nonbiodegradable conductive polymers in the composites and the biodegradable conductive polymers to achieve high conductivity. The dopants are used to dope the polymer via physical mixture, thus the dopants become free to move with time or electrical stimulus, which deteriorates the electrical properties such as conductivity and electrical stability of conductive polymers and affects their cytotoxicity as well. Covalently bond dopants have also been used to produce conductive polymers. However, these polymers with covalently bond dopants are not biodegradable. With increasing interest in soft tissue engineering and soft/stretchable electronics, materials with good flexibility and elasticity are desirable. There remains a need to make biodegradable conductive polymers with stable electrochemical performance, that are robust, soft and elastic without non-biodegradable dopant.

SUMMARY OF THE INVENTION

In a general aspect, the present disclosure discloses a dopant-free conductive elastomer that exhibits good flexibility and elasticity, biodegradation, processability, and conductive stability without extra dopant involvement.

In one aspect, the present disclosure discloses a dopant free conductive bioelastomer including a polyurethane synthesized from at least one polymeric diol, at least one diisocyanate, at least one bishydroxy acid, and at least one aniline oligomer. In one embodiment, the aniline oligomer is an aniline trimer. In various embodiments, the bioelastomer comprises a polyurethane synthesized from a polymeric diol that is caprolactone, and/or a diisocyanate that is hexamethylene diisocyanate.

In various embodiments, the dopant free conductive bioelastomer of the invention is biodegradable.

In one embodiment, the dopant free conductive bioelastomers disclosed herein are synthesized by a two-step polymerization including reaction of at least one polymer diol and at least one diisocyanate in a first step "a", and in a second step "b", reacting the reaction product from step "a" with an aniline oligomer. In a further embodiment, the method includes reaction of a bishydroxy acid with diol and diisocyanate in step a.

In one aspect, the dopant free conductive bioelastomer comprises a polyurethane polymer synthesized from polycaprolactone, at least one diisocyanate, at least one bishydroxy acid, and at least one aniline oligomer. In one embodiment, the bioelastomer has a conductivity that is at least $10^{-5}$ to $10^{-3}$ S/cm. In various embodiments, the conductivity of the bioelastomer does not change significantly after 14 days of enzymatic degradation.

Details associated with the embodiments described above, as well as details of other embodiments are described below.

BRIEF DESCRIPTION OF THE DRAWINGS

The following drawings illustrate by way of example and not limitation. For the sake of brevity and clarity, every feature of a given structure is not always labeled in every figure in which that structure appears.

In FIGS. 5A-5E.

The symbols * in the FIGS. 1-9 represents significantly different groups (p<0.05).

DETAILED DESCRIPTION OF THE INVENTION

The present invention will now be described more fully hereinafter with reference to the accompanying Drawings and Supporting Information, in which some example embodiments of the invention are shown. This invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Throughout this disclosure, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

The examples contained herein serve to further illustrate the invention, to provide those of ordinary skill in the art with a complete disclosure and description of how the compounds, compositions, articles, devices, and/or methods claimed herein are made and evaluated, and are not intended to limit the scope of the technology. In the examples, unless expressly stated otherwise, amounts and percentages are by weight, temperature is in degrees Celsius or is at ambient temperature, and pressure is at or near atmospheric.

Disclosed herein is a single-component dopant-free conductive polyurethane elastomer (DCPU) that is produced by chemically linking biodegradable segments, conductive segments, and dopant molecules into one polymer chain. The DCPU films produced from the DCPU have robust mechanical properties with high elasticity and conductivity and are degradable enzymatically and/or by hydrolysis. The DCPU films disclosed herein exhibit electrical stability in physiological environment with charge. Mouse 3T3 fibroblasts survive and proliferate on these films exhibiting good cytocompatibility. Polymer degradation products resultant from DCPU disclosed herein are non-toxic. The DCPU disclosed herein can also be processed into a porous scaffold. In an in vivo subcutaneous implantation model, the DCPU disclosed herein exhibits good tissue compatibility with extensive cell infiltration over 2 weeks. The biodegradable DCPU disclosed herein is flexible, elastic, processable, and electrically stable and enables broad applications for example in tissue repair and soft/stretchable/wearable bioelectronics.

The DCPU disclosed herein comprises polymeric diol (PD), diisocyanate (DI), bishydroxy acid (BHA), and aniline oligomer (AO) and has a formula of —(CO—NH—DI—NH—CO)$_n$—(O—PD—O)$_x$—(CO—NH—DI—NH—CO)$_n$—(NH—AO—NH)$_z$—(CO—NH—DI—NH—CO)$_m$—(O—BHA—O)$_y$—(CO—NH—DI—NH—CO)$_m$—, wherein the ration between X:Y:(N+M):Z is in the range of 1.9:0.1:4:1 and 1:1:4:1, preferably 1.8:0.2:4:1 and 1.4:0.6:4:1. The DCPU can also be expressed by a shortened formula of —(O-PD-O)$_x$—(CO—NH-DI-NH—CO)$_n$—(NH-AO-NH)$_z$—(CO—NH-DI-NH—CO)$_m$—(O-BHA-O)$_y$—, wherein the ratio between x:y:(n+m):z is in the range of 0.95:0.05:2:1 and 0.5:0.5:2:1, for example, 0.9:0.1:2:1, 0.85:0.15:2:1, 0.8:0.2:2:1, 0.75:0.25:2:1, 0.7:0.3:2:1, 0.65:0.35:2:1, 0.6:0.4:2:1, or 0.55:0.45:2:1.

The polymeric diol can be selected from polycaprolactone (PCL), poly (trimethylene carbonate) (PTMC), poly (hexamethylene carbonate), poly (lactide-co-caprolactone) (PLC), poly (6-valerolactone-co-caprolactone) (PVCL), and poly ethylene glycol (PEG) containing triblock copolymer diols of PCL-PEG-PCL, PTMC-PEG-PTMC, PVCL-PEG-PVCL, or PLC-PEG-PCL, or a combination thereof. The aniline oligomers can be selected from the group consisting of aniline trimer, aniline tetramer, aniline pentamer, aniline hexamer, aniline heptamer, and aniline octamer, or a combination thereof. The diisocyanate can be selected from the group consisting of butane diisocyanate (BDI), hexamethylene diisocyanate (HDI), and L-lysine diisocyanate, or a combination thereof. The bishydroxy acid can be selected from dimethylolpropionic acid (DMPA) and 2,2-Bis (hydroxymethyl)butyric acid, or a combination thereof.

The elastomers disclosed herein have good conductivity. In some embodiments, the elastomers disclosed herein have a conductivity of at least $10^{-5}$ to $10^{-3}$ S/cm. The elastomers described herein are electrically stable. In some embodiments, the conductivity of the elastomers does not change significantly after 14 days enzymatic degradation, or with electronic charge for 150 h. The elastomers described herein are flexible and elastic. In some embodiments, the elastomers described herein have more than 99% instant elastic recovery after at least 3 to 10 cycles stretching at 10% strain. The elastomers disclosed herein are biodegradable and do not produce toxic degradation products.

In some embodiments, the dopant free conductive polyurethane elastomer described herein has a formula of —(CO—NH-HDI-NH—CO)$_n$—(O-PCL-O)$_x$—(CO—NH-HDI-NH—CO)$_n$—(NH-A3-NH)$_z$—(CO—NH-HDI-NH—CO)$_m$—(O-DMPA-O)$_y$—(CO—NH-HDI-NH—CO)$_m$, wherein PCL is polycaprolactone diol, HDI is hexamethylene diisocyanate, A3 is aniline trimer, and DMPA is dimethylolpropionic acid and the ratio between x:y:(n+m):z is in the range of 1.8:0.2:4:1 and 1.4:0.6:4:1. The DCPU can also be expressed by a shortened formula of —(O-PCL-O)$_x$—(CO—NH-HDI-NH—CO)$_n$—(NH-A3-NH)$_z$—(CO—NH-HDI-NH—CO)$_m$—(O-DMPA-O)$_y$—, wherein the ratio between x:y:(n+m):z is in the range of 0.9:0.1:2:1 and 0.7:0.3:2:1, for example, 0.875:0.125:2:1, 0.85:0.15:2:1, 0.825:0.1.75:2:1, 0.8:0.2:2:1, 0.775:0.225:2:1, 0.75:0.25:2:1, or 0.725:0.275:2:1.

The dopant free conductive polyurethane elastomer can be synthesized via a two-step polymerization method. Specifically, the method comprises the steps of (a) reacting a polymer diol (PD), a bishydroxy acid (BHA), and a diisocyanate (DI) to form a product mixture that comprises a PD containing diisocyanate and a BHA containing diisocyanate; and (b) reacting the product of step (a) with an aniline oligomer (AO) to form the elastomer that has a formula of —(CO—NH-DI-NH—CO)$_n$—(O-PD-O)$_x$—(CO—NH-DI-NH—CO)$_n$—(NH-AO-NH)$_z$—(CO—NH-DI-NH—CO)$_m$—(O-BHA-O)$_y$—(CO—NH-DI-NH-co)$_m$—, wherein the amount of PD, BHA, DI, and AO used is adjusted such that the ratio between x:y:(n+m):z is in the range of 1.9:0.1:4:1 and 1:1:4:1. The DCPU can also be expressed by a shortened formula of —(O-PD-O)$_x$—(CO—NH-DI-NH—CO)$_n$—(NH-AO-NH)$_z$—(CO—NH-DI-NH—CO)$_m$—(O-BHA-O)$_y$—, wherein the amount of PD, BHA, DI, and AO used is adjusted such that the ratio between x:y:(n+m):z is in the range of 0.95:0.05:2:1 and 0.5:0.5:2:1. In one embodiment, the polymer diols is polycaprolactone diol, the diisocyanate is hexamethylene diisocyanate, the aniline oligomer is aniline trimer, and the bishydroxy acid is DMPA.

Conductive Polymers

Conductive biomaterials, including conductive composites and polymers, have been explored for their application as smart scaffolds for tissue repair and regeneration[1]. It is believed that conductive biomaterials can deliver electrical stimulation to cells and modulate cell behavior (e.g., adhesion, migration, proliferation and differentiation)[1, 2]. They can also promote repair and regeneration of various tissues, such as myocardium, nerve, muscle, skin and bone, compared with conventional insulate biodegradable polymers[3-6]. For example, aligned electrospun poly(ε-caprolactone)/polyaniline fibrous scaffolds could guide myoblast orientation and promote myotube formation[3]. Alginate scaffold incorporated with gold nanowires enhanced electromechanical coupling and contractile properties of cardiac patches, and promoted the growth and maturation of cardiac cells[4]. A multiwalled carbon nanotube (MWCNTs)-coated 3D collagen sponge was implanted in rat femur and significantly more bone formation was observed around the MWCNT-coated sponge than the uncoated sponge at 28 and 56 days[5]. Inner walls of nerve guidance channels coated with polypyrrole-based copolymers promoted neurite growth in the sciatic nerves of rats within 8 weeks[6]. Besides tissue engineering application, conductive biomaterials have great potential in other biomedical applications, such as electrically-triggered drug release, biosensors, and bioactuators[7-10].

Current conductive composites contain biodegradable polymers (e.g., polylactide, polycaprolactone, and polyurethane) and organic conductive polymers (e.g., polyaniline, polypyrrole, and poly(3,4-ethylenedioxythiophene) (PEDOT)) or inorganic additives (e.g., carbon nanotubes, graphene, gold nanowire), in which the biodegradable polymers provide mechanical behavior and the non-degradable additives provide electric conductivity[4,11-13]. Biodegradable conductive polymers are synthesized through conjugating conductive segments with biodegradable polymers, such as polylactide-aniline pentamer-polylactide (PLA-AP-PLA)[2], polypyrrole-co-polycaprolactone (PPy-PCL)[14], and hyperbranched ductile polylactide (HPLA)-co-aniline tetramer (AT) (HPLAAT)[15], which require mixing with dopants for conductivity. However, there are some major concerns about the use of these conductive biomaterials for tissue repair and regeneration. A dopant is required for conventional conductive polymers in the composites and the biodegradable conductive polymers to achieve high conductivity[16,17]. They are used to dope the polymer via physical mixture, and they can leach with time or electrical stimulus. This behavior not only deteriorates the electrical properties (e.g., conductivity and electrical stability) of conductive polymers but also affects their cytotoxicity[1,17,18]. Furthermore, the addition of dopants could influence other material properties of the conductive polymers[17]. For example, their mixture can increase the stiffness of conductive material, and negatively affect the material flexibility and elasticity, which could limit their application in soft tissue repair and regeneration and in soft/stretchable electronics[16, 19-21]. An alternative approach to avoiding the dopant mixture is to covalently bind the dopants into a polymer constituent and then dope the conductive polymers[22, 23]. A hybrid conductive hydrogel without the need for mobile doping ions was prepared with PEDOT evenly distributed in poly (vinyl alcohol) (PVA)/heparin methacrylate (Hep-MA) hydrogel. Heparin was covalently bound to the PVA backbone and doped the PEDOT[22]. The conductive hydrogel exhibited superior mechanical stability and retained superior electroactivity compared to metal electrodes. Unfortunately, the lack of biodegradability could limit the use of these hybrids in tissue engineering application. Disclosed herein is a biodegradable conductive polymer with desirable electrical (stable electrochemical performance) and mechanical (robust, soft and elastic) properties without dopant mixture.

The present disclosure discloses a dopant-free conductive elastomer that is produced by chemically linking biodegradable segments, conductive segments, and dopant molecules into one polymer chain. For example, a biodegradable polycaprolactone diol (PCL), conductive aniline trimer, and dopant dimethylolpropionic acid (DMPA) are linked into a polyurethane chain through hexadiisocyanate. The electrical, mechanical and biodegradable properties of the conductive polyurethane films were characterized. The electrical stability was evaluated under physiological conditions. Cytotoxicity of the conductive polyurethane degradation products and the cytocompatibility of the conductive films were assessed using mouse 3T3 fibroblasts. Furthermore, the dopant-free conductive polyurethane was processed into porous scaffolds using salt-leaching, and then implanted into a mouse subcutaneous model for in vivo biocompatibility evaluation.

Characterization of the Dopant-Free Conductive Polyurethane (DCPU)

Figure 1A:
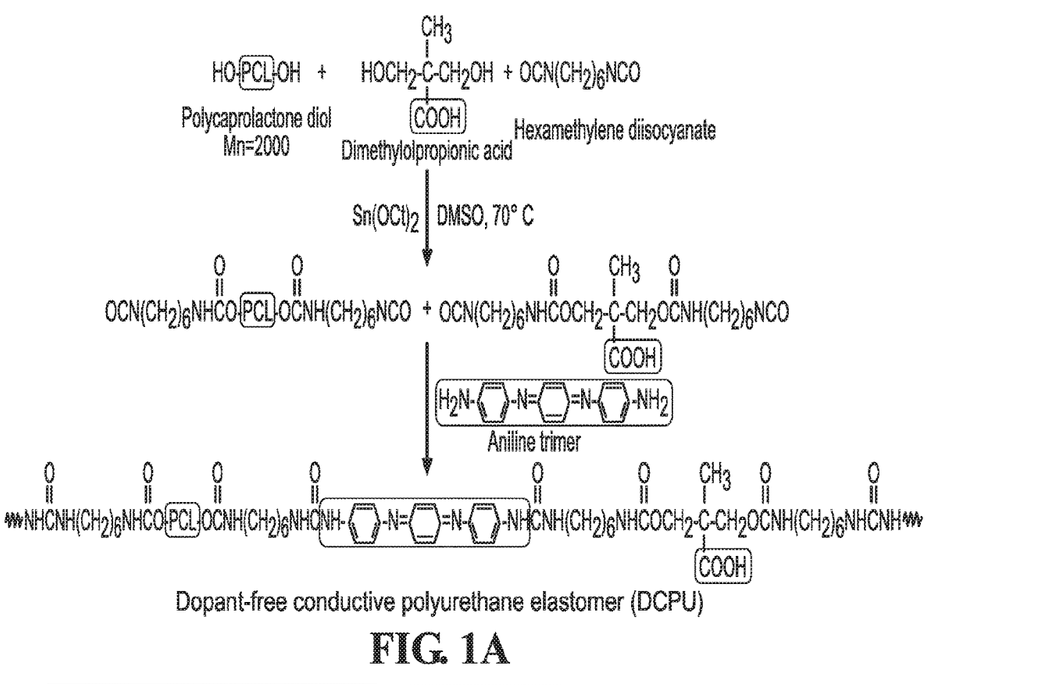
FIG. 1A shows a synthetic scheme of a dopant-free conductive polyurethane elastomer (DCPU) according to one embodiment of the invention.
Figure 1B:
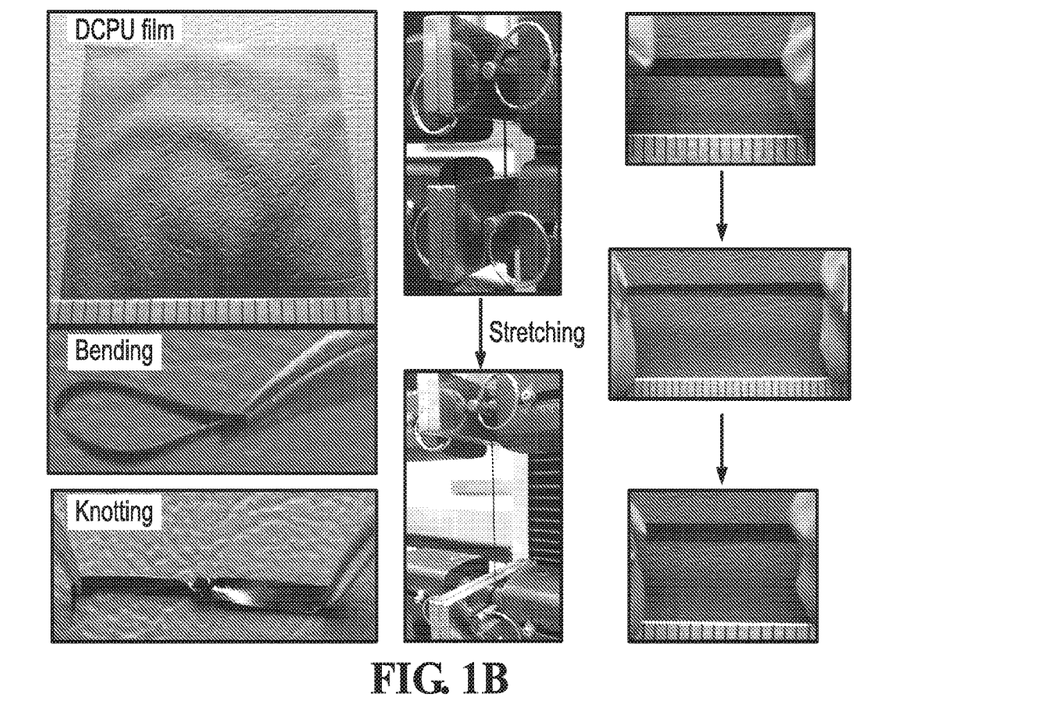
FIG. 1B shows a DCPU film made from the elastomer of FIG. 1A and the film's high elasticity presented by bending, knotting, stretching and recoiling.
Figure 2:
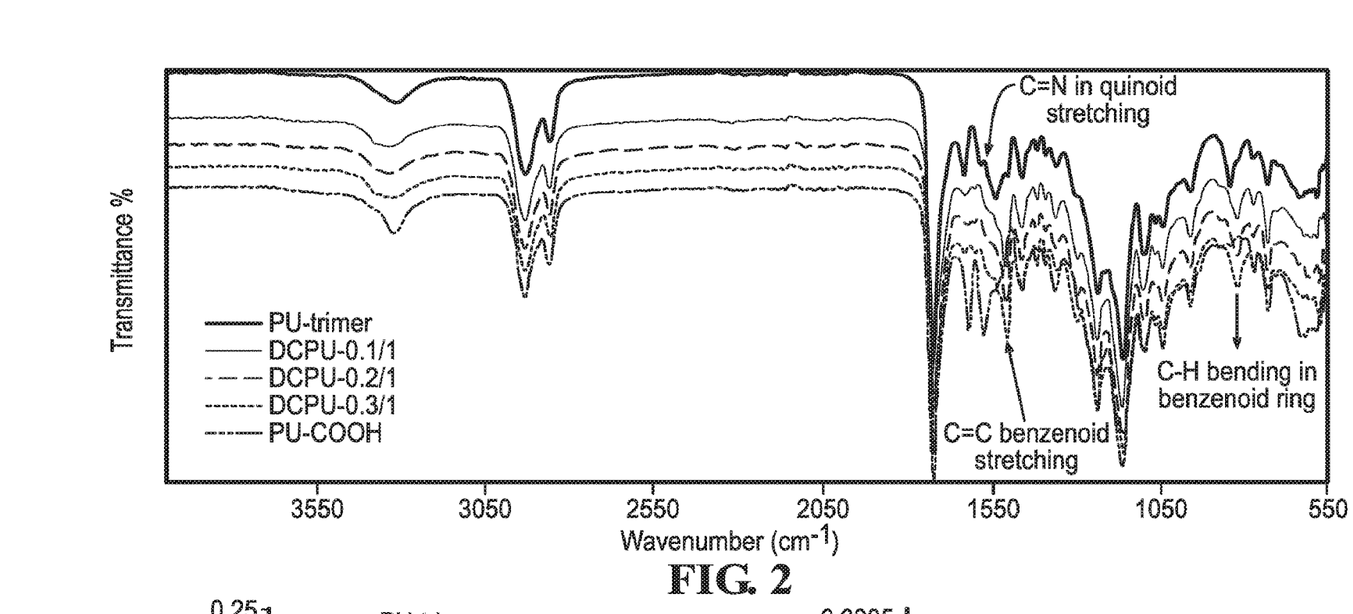
FIG. 2 shows FT-IR spectra of DCPU of FIG. 1A.

DCPU was synthesized from PCL (biodegradable segment), aniline trimer with two amine end groups (conductive segment), and DMPA (dopant molecule) with 1,6-hexamethylene diisocyanate (HDI) using two-step solvent polymerization (FIG. 1A). The PCL:DMPA:HDI:aniline trimer feeding ratios were varied such that the ratio between x:y:(n+m):z in the shortened formula of the resulting DCPUs were 0.9:0.1:2:1, 0.8:0.2:2:1, and 0.7:0.3:2:1, which were referred to as DCPU-0.1/1, DCPU-0.2/1, and DCPU-0.3/1 (Table 1 of FIG. 10). Electroactive DCPU films with high elasticity and flexibility were then obtained (FIG. 1B). Polyurethane without DMPA (PU-trimer) and polyurethane without aniline trimer (PU—COOH) were two control groups. The chemical structure of the DCPU was verified by Fourier transform infrared spectroscopy (FTIR; FIG. 2). The urethane and urea groups were confirmed by specific peaks at 3340 $cm^{-1}$ (N—H stretching of urethane and urea groups), 2940 $cm^{-1}$ and 2860 $cm^{-1}$ (symmetric and asymmetric C—H stretching), 1720 $cm^{-1}$ (C=O stretching of urethane and urea groups)[24]. The specific peaks for aniline trimer were located at 1600 $cm^{-1}$ and 1510 $cm^{-1}$ (C=C stretching of quinoid and benzenoid rings), and 820 $cm^{-1}$ (C—H bending in) benzenoid rings)[25, 26].

The DCPU polymers had low glass transition temperatures (Tgs) below −60° C. (Table 1 of FIG. 10), which were attributed to PCL soft segment. The Tg decreased by reducing the PCL amount in DCPU backbone. The melting temperatures (Tms) of DCPU resulted from the semicrystalline PCL segment, and decreased from 29° C. to 24° C. with decreased PCL amount in DCPU backbone. The inherent viscosities of DCPU ranged from 1.20 (DCPU-0.3/1) to 2.32 dL/g (DCPU-0.1/1; Table 1 of FIG. 10). The water absorption increased with the increasing DMPA amount in DCPU, which was contributed to the hydrophilic carboxyl group on DMPA (Table 1 of FIG. 10). DCPU-0.1/1 had the lowest water absorption at 8±1%, while DCPU-0.3/1 had the highest water absorption at 15±2%.

Figure 3A:
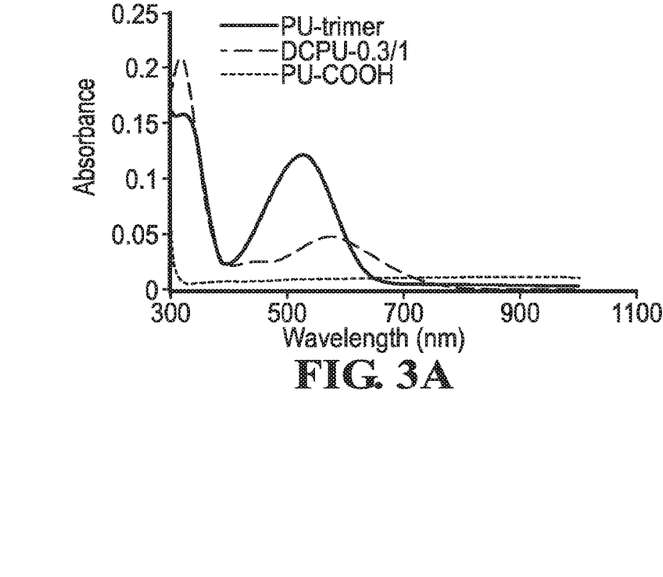
FIG. 3A shows electroactivity of DCPU of FIG. 1A having UV-vis spectra of PU-trimer, DCPU-0.3/1 and PU—COOH in DMF.

The UV-vis spectra of PU-trimer, DCPU-0.3/1, and PU—COOH, shown in FIG. 3A show their electroactivities and the effects of the conjugated proton donor (DMPA) on DCPU electroactivity. The PU-trimer had two typical absorption peaks at 526 nm ($\pi_b$-$\pi_q$ transition from the benzene ring to the quinoid ring) and 323 nm ($\pi$-$\pi^*$ transition in the benzene ring), which were routinely observed for the emeraldine base form of polyaniline derivatives[27, 28]. After introducing DMPA into the DCPU backbone, the absorption peak at 526 nm shifted to 578 nm, and a small shoulder band at 438 nm appeared, representing the delocalized polaron peak arising from the polaron-$\pi^*$ transition[2, 29]. However, the PU—COOH showed no absorption peaks in the wavelength range from 300 nm to 1,000 nm due to the absence of aniline trimer in the polyurethane backbone.

Electrical and Electrochemical Properties of DCPUs

Figure 10:
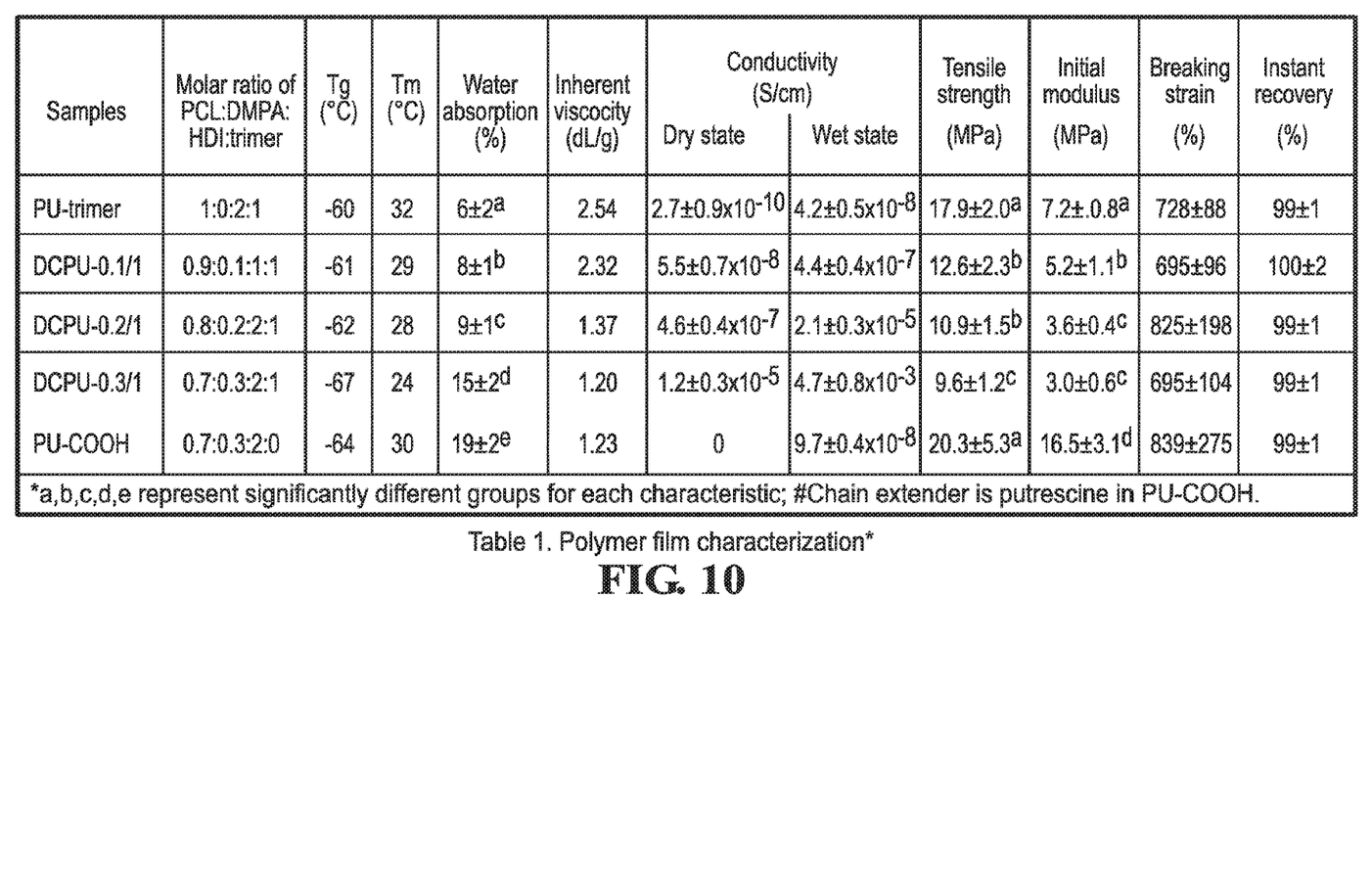
FIG. 10 shows a table listing the results of DCPU film characterization.

The electrical conductivity of DCPU films in dry and wet states is summarized in Table 1 of FIG. 10. The conductivities of DCPUs in the dry state ranged from 5.5±0.7×$10^{-8}$ to 1.2±0.3×$10^{-5}$ S $cm^{-1}$. With fixed aniline trimer content, the conductivity of the DCPU rose with an increasing DMPA amount in the polyurethane backbone. The PU-trimer without a dopant possessed very low conductivity at 2.7±0.9×$10^{-10}$ S $cm^{-1}$, and the PU—COOH without aniline trimer showed a conductivity value close to 0 S $cm^{-1}$. The conductivities of DCPUs in the wet state (phosphate buffer solution (PBS) immersion) markedly increased compared to those in the dry state, ranging from 4.4±0.4×$10^{-7}$ to 4.7±0.8×$10^{-3}$ S $cm^{-1}$. These conductivity values of DCPUs in the wet state showed the same trend as those in the dry state (Table 1 of FIG. 10). The conductivity of wet PU—COOH was 9.7±0.4×$10^{-8}$ S $cm^{-1}$. This increase was attributed to the absorbed PBS in the polymer matrix associated with its bulk hydrophilicity (Table 1 of FIG. 10). The conductivities of DCPUs were lower than the conductivities of polyaniline (5 S $cm^{-1}$)[1] and some reported biodegradable conductive materials, such as a polythiophene-based multilayer film (2.7×$10^{-2}$ S $cm^{-1}$)[30] and a polypyrrole-b-polycaprolactone (PPy-PCL) copolymer (10-20 S $cm^{-1}$)[14]. However, the conductivities of DCPUs in wet state (from 4.4±0.4×$10^{-7}$ to 4.7±0.8×$10^{-3}$ S $cm^{-1}$) are also comparable to or higher than some reported conductive biomaterials, which have been applied for neural and myocardial repair[31-35]. For example, a blended scaffold of conductive polyurethane containing aniline pentamer and PCL (10×$^{-5}$±0.09 S $cm^{-1}$) was capable of improving the adhesion and proliferation of rat neonatal cardiomyocytes[31, 32]. Polypyrrole-containing nanofibrous scaffolds (1.3×$10^{-5}$ to 3.7×$10^{-4}$ S $cm^{-1}$) promoted cardiomyocyte attachment, proliferation and interaction as well as cardiac-specific protein expression[33]. Three-dimensional engineered cardiac tissues (ECTs) from single walled carbon nanotubes (SWNTs) and gelatin hydrogels (~$10^{-3}$ S/cm)[34] enhanced in vitro cardiac contraction and the expression of electrochemical associated proteins, and also structurally integrated with the host myocardium and improved heart function in rats[34]. Furthermore, a biodegradable conductive composite made of polypyrrole (2.5% w/w) and chitosan (97.5% w/w) (1.3±0.1×$10^{-3}$ S cm$^{-1}$) supported the adhesion, spreading and proliferation of olfactory ensheathing cells with or without electrical stimulation[35]. Thus, it is plausible that the electrical conductivities of DCPU polymers would be sufficient to pass the low micro-current in human bodies and positively affect the cell behaviors such as cell adhesion, proliferation and differentiation.[36-38]

Figure 3B:
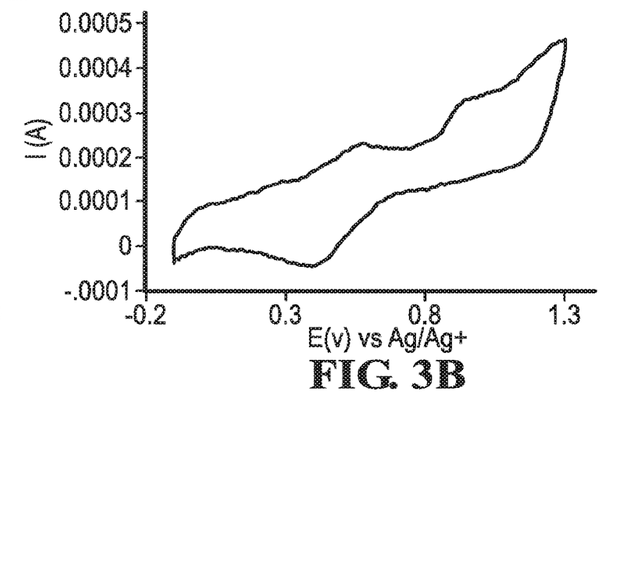
FIG. 3B shows electroactivity of DCPU of FIG. 1A having cyclic voltammogram of DCPU-0.3/1 polymer on Pt electrode in 1.0 M $H_2SO_4$ using Ag/AgCl as reference with scan rate of 50 mV $s^{-1}$.

In the cyclic voltammogram of DCPU-0.3/1 (FIG. 3B), the first redox peak at 550 mV represented the reversible redox process from the leucoemeraldine form to the emeraldine form. With higher potentials, the second peak at 930 mV corresponded to the transition from the emeraldine form to the pernigraniline form. However, the PU-trimer and PU—COOH displayed undetectable electrochemical signals due to their poor conductivities (data not shown). The obvious redox peaks corresponding to the transitions of the three oxidation/reduction forms in DCPU-0.3/1 revealed good electroactivity of the DCPU polymer.

Mechanical Properties of DCPU Films

Figure 4A:
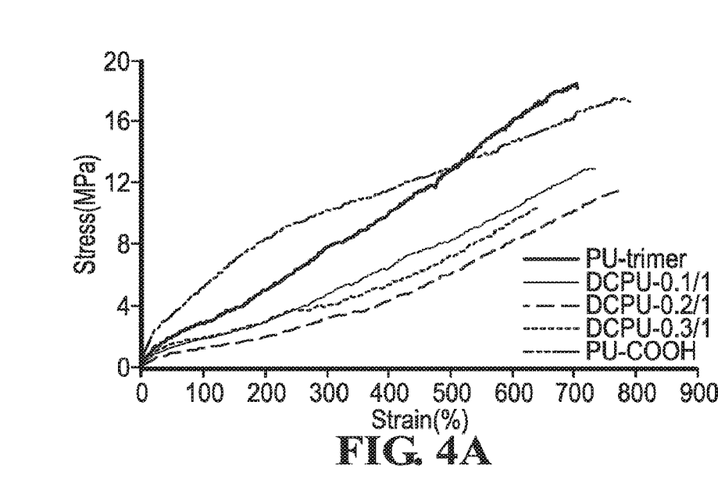
FIG. 4A shows mechanical properties of DCPU films of FIG. 1B with stress-strain curves of the DCPU films.

The DCPU films exhibited robust mechanical properties with softness and high elasticity. The videos and digital images show the attractive mechanical properties of the DCPU polymer, including bending, knotting, stretching, and recoiling (FIG. 1B). The stress-strain curves of these synthesized polyurethanes showed the typical "S" shape (FIG. 4A), and the tensile strengths and initial moduli of the DCPU films ranged from 9.6±1.2 to 12.6±2.3 MPa and from 3.0±0.6 to 5.2±1.1 MPa, respectively (Table 1 of FIG. 10). The tensile strengths and initial moduli decreased with increased DMPA content in the DCPU backbone. This might be attributed to the decreased semicrystalline PCL content in the polyurethane backbone, along with reduced PCL crystallinity, which was consistent with the DSC results (Table 1 of FIG. 10). The breaking strain of the DCPU films ranged from 685±104% to 825±198%, with no significant difference between each group (p>0.05). The instant recovery of all DCPU films was ≥99% after three cycles of stretching at 10% strain (Table 1 of FIG. 10).

Figure 4B:
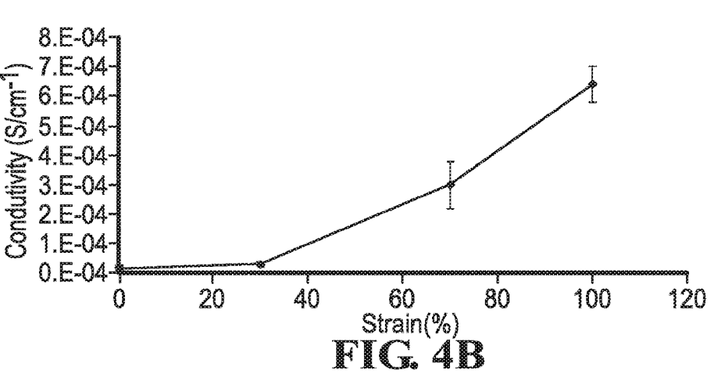
FIG. 4B shows mechanical properties of DCPU films of FIG. 1B with dependence of electrical conductivity of DCPU-0.3/1 on applied strains varied from 30% to 100%.

The conductivity change of DCPU-0.3/1 was monitored at various uniaxial strains (30%, 70%, and 100% strain) at room temperature (FIG. 4B). There was a slight conductivity increase of the DCPU-0.3/1 film from 1.2±0.3×$10^{-5}$ S cm$^{-1}$ (unstretched) to 3.2±0.8×$10^{-5}$ S cm$^{-1}$ at a strain of 30%, followed by a sharp rise to 6.4±0.6×$10^{-4}$ S cm$^{-1}$ at 100% strain, which was a 43-fold increase compared with that of unstretched DCPU-0.3/1 film. The conductivity increase of the DCPU film by applied strains (from 30% to 100%) was primarily due to the oriented polymer chains along the stretched direction[39].

Figure 4C:
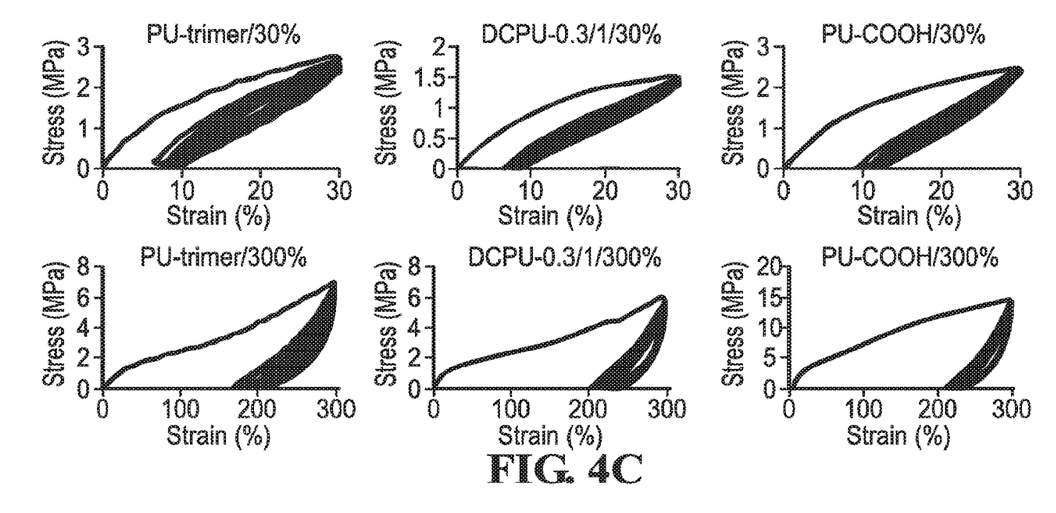
FIG. 4C shows mechanical properties of DCPU films of FIG. 1B with cyclic stretching of PU-trimer and DCPU-0.3/1 at 30% and 300% deformations.

To study the resilience of DCPU films, cyclic stretching was performed at a maximum strain of 30% and 300% (FIG. 4C and Supplementary FIG. S1). All the polymers had a large hysteresis loop in the first cycle, followed by smaller hysteresis loops in the next nine cycles. All the samples showed small irreversible deformations (<10%) at a maximum strain of 30%. With the maximum strain of 300%, the irreversible deformations became larger for all polymer samples (~200%). These results verified that DCPUs are robust, elastic, and flexible, which is promising for soft tissue repair and stretchable soft electronics use.

In Vitro Degradation of DCPU Films

Figure 5A:
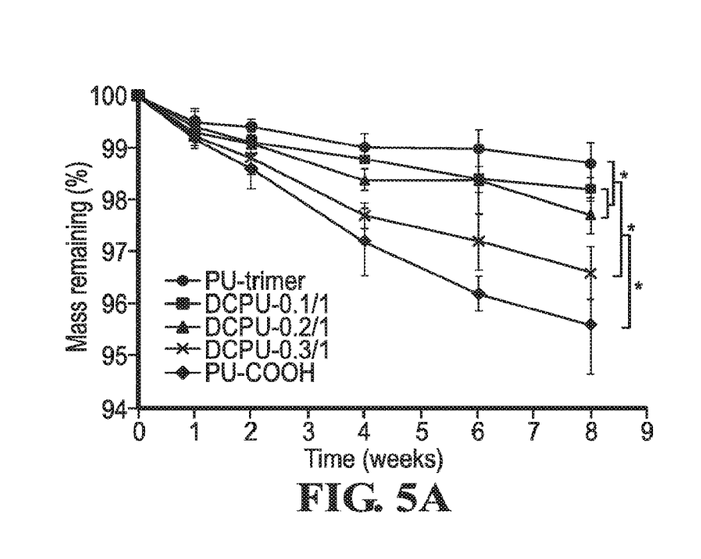
FIG. 5A shows DCPU films of FIG. 1B degradation with mass remaining in PBS at 37° C.
Figure 5B:
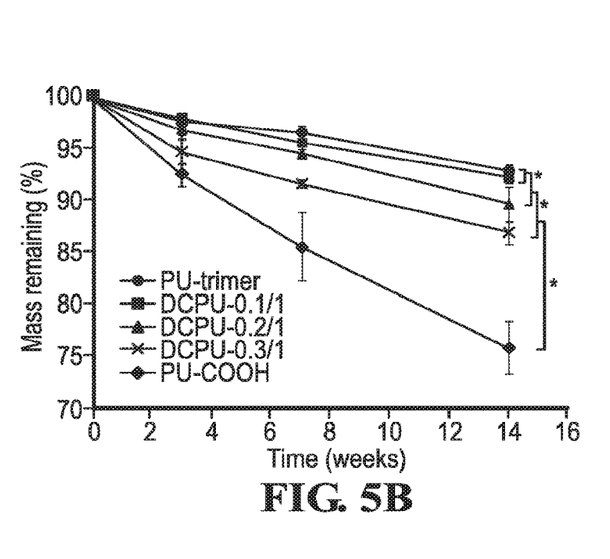
FIG. 5B shows DCPU film of FIG. 1B degradation with mass remaining in 100 U mL$^{-1}$ lipase in PBS solution at 37° C.

DCPUs could be degraded by hydrolysis and enzymes (FIGS. 5A and 5B). For hydrolytic degradation in PBS (FIG. 5A), DCPU polymers showed low degradation rates in 8 weeks with mass remaining ranging from 96.6±0.5% (DCPU-0.3/1) to 98.2±0.2% (DCPU-0.1/1; p<0.05). The degradation rates of DCPUs increased with an increasing DMPA amount in the DCPU backbone, which resulted from the hydrophilic carboxyl groups in the polyurethane backbone. The higher carboxyl group content allowed more water penetration into the polyurethane film, which then led to faster hydrolysis[40]. Besides, many enzymes exist in the human body that can accelerate the degradation of the polymer in vivo[41]. In lipase/PBS solution (FIG. 5B), all polymers degraded faster than in PBS solution. Within 14 days, the polymer degradation behavior showed similar trends as that of DCPUs in PBS. DCPU-0.1/1 had the lowest degradation rate (92.4±0.6% mass remaining), whereas DCPU-0.3/1 had the highest degradation rate (75.8±2.6% mass remaining).

Figure 5C:
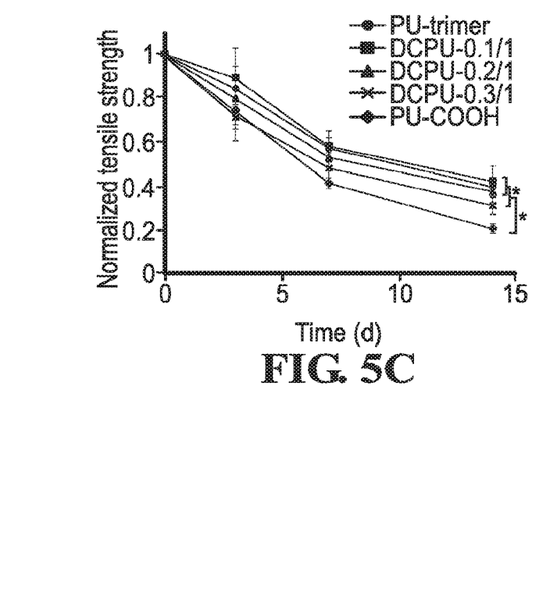
FIG. 5C shows the changes of tensile strengths.
Figure 5D:
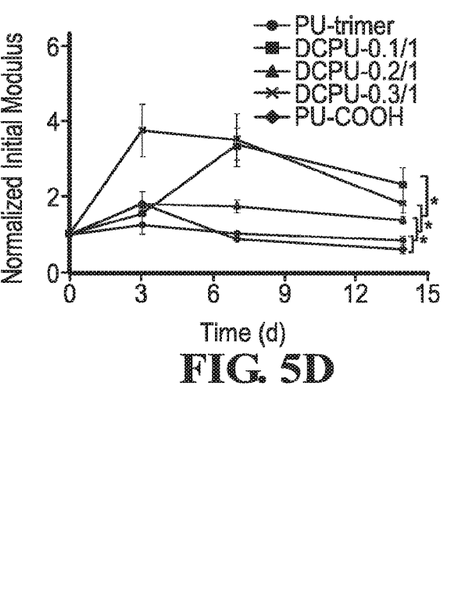
FIG. 5D shows the changes of initial moduli.
Figure 5E:
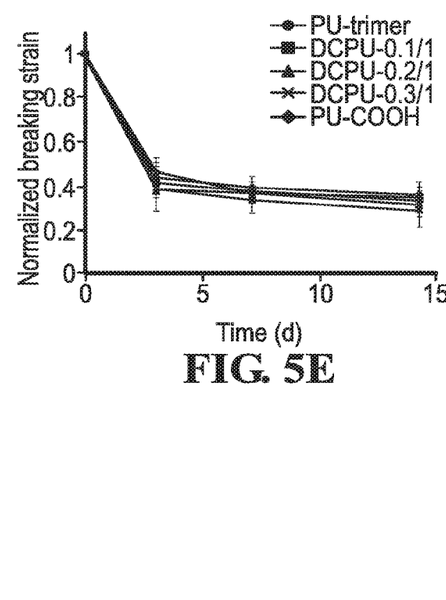
FIG. 5E shows the changes of breaking strains of DCPU films with enzymatic degradation at 37° C.

The changes in mechanical property of DCPU films with degradation time were characterized after 3, 7, and 14 days of degradation in lipase/PBS solution (FIG. 5C-5E). The tensile strengths of the DCPU films decreased with increasing degradation time. The tensile strength reductions increased with increased hydrophilicity of DCPU polymers. The DCPU-0.3/1 had the highest tensile strength reduction (68.2±4.2% at day 14), and the DCPU-0.1/1 had the lowest tensile strength reduction (57.9±7.1% at day 14). The initial moduli of DCPU films eventually showed a decreasing trend after 14 days of degradation with a temporary increase at the beginning of the degradation period. A possible explanation for this phenomenon could be that at an early stage of enzymatic degradation, soft segment degradation starts earlier and is faster while hard segment degradation may not begin until later or be slower. This result was comparable to a previous study on the hydrolytic degradation of polyurethanes (PU) synthesized from PCL, 1,4-butanediisocyanate and 1,4-butanediol in PBS at 37° C. over 400 days[42]. It was observed that the Young's modulus of PU-2300 (containing PCL with molecular weight at 2300 g/mol) increased up to 300 days and then decreased, which was related to the crystallinity changes with time. In addition, the breaking strains of the DCPU films decreased with the enzymatic degradation time without significant difference between each sample (p>0.05).

Electrical Stability of DCPU

Figure 6A:
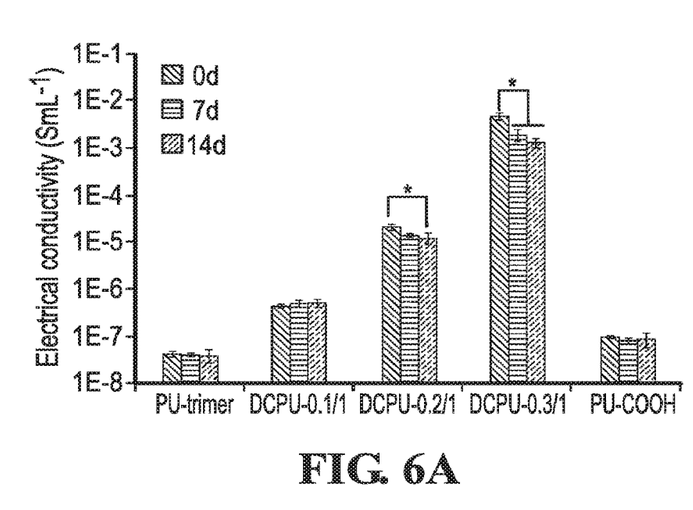
FIG. 6A shows the electrical stability of DCPU of FIG. 1B with changes in electrical conductivities of DCPU films in lipase/PBS solution within 14 days.

The electrical conductivity changes of DCPU films with enzymatic degradation up to day 14 are shown in FIG. 6A. The conductivities of DCPU-0.2/1 and DCPU-0.3/1 were slightly reduced from 2.1±0.3×$10^{-5}$ S cm$^{-1}$ at day zero to 1.2±0.3×$10^{-5}$ S cm$^{-1}$ at day 14, and from 4.7±0.8×$10^{-3}$ S cm$^{-1}$ at day zero to 1.3±0.3×$10^{-3}$ S cm$^{-1}$ at day 14, respectively (p<0.05). Although the conductivities of DCPU-0.2/1 and DCPU-0.3/1 decreased, the values did not fall below more than an order of magnitude over 14 days of enzymatic degradation. Similar testing was carried out by immersing poly(glycerol-sebacate)/polyaniline composites in PBS solution and recording their conductivity changes every 24 h for a period of 4 days[43]. The conductivities of those composites decreased with time and eventually fell by around an order of magnitude. It must be noted that the enzymatic degradation of polymer in lipase/PBS solution was much faster than the hydrolytic degradation in PBS. Thus, DCPUs may be able to maintain their conductivities for a longer time in a physiological environment, which was further proved by the electrical stability testing of DCPU.

Figure 6B:
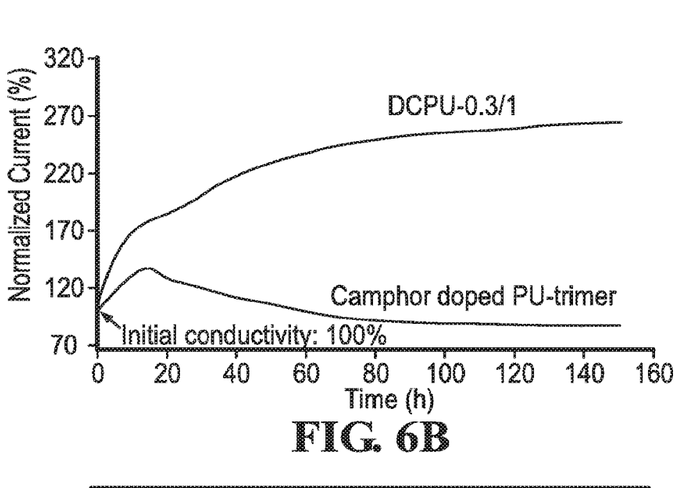
FIG. 6B show the electrical stability of DCPU of FIG. 1B with relationship between electrical current and incubation time in the electrical stability test of DCPU-0.3/1 film in cell culture medium. Camphor doped PU-trimer film was used as a control.

The electrical stability of DCPU-0.3/1 film was conducted in the cell culture medium with a long-term charge of a fixed voltage (FIG. 6B). The detected current changes directly reflected the changes in film conductivity. The current in FIG. 6B was normalized against the initial value at time zero. When the DCPU-0.3/1 film was immersed in the cell culture medium, the current doubled in the first 22 h and then gradually increased. At 150 h, the current reached up to 264% of the initial value. To further demonstrate the good electrical stability of DCPUs, PU-trimer doped with (1 S)-(+)-10-camphorsulfonic acid (CSA; the molar ratio of CSA:aniline trimer was set as 1.5:1) was treated under the same conditions (FIG. 6B). After 150 h of charge, the CSA-doped PU-trimer retained only 88% of its initial conductivity. The proton donor (DMPA) was covalently conjugated into the polyurethane backbone, which made the proton donor more difficult to leach out with time or electrical stimulus compared with those free dopants physically mixed in conductive polymers. Furthermore, because of the water absorption ability of DCPU-0.3/1 (15±2%), shown in Table 1 of FIG. 10, the absorbed cell culture medium with a large amount of electrolytes diffused in polymer matrix made DCPU-0.3/1 possess almost triple conductivity after 150 h of immersion in cell culture medium (264% of initial conductivity)[44].

The conductive stability of the conductive material is very significant for in vitro cell culture and in vivo implantation. Conductivity normally decreases with degradation, dopant leaching, and electrical charge (de-doping)[17, 18, 43]. For DCPU, the dopant was covalently linked with the polymer, which significantly reduced dopant leaching and de-doping and gave the polymer good conductive stability. Because of the unavoidable wet environment during biomedical applications[45], DCPUs with good electrical stability have great potential application as electroactive biomaterials.

Cytotoxicity and Cytocompatibility of DCPUs

The cytocompatibility of DCPU films and the cytotoxicity of their degradation products were evaluated using mouse 3T3 fibroblasts (FIG. 7). The cell viability of all DCPU polymers showed no significant difference from that of the Dulbecco's modified Eagle's medium (DMEM) control when the concentration of polymer degradation products was ≤0.1 mg mL$^{-1}$ (p>0.05; FIG. 7A). There was no statistical difference between each DCPU polymer group at the same concentration of polymer degradation products (p>0.05). This trend was further visualized by the optical images of 3T3 fibroblasts exposed to different concentrations of DCPU degradation products (FIG. 7B).

Figure 7A:
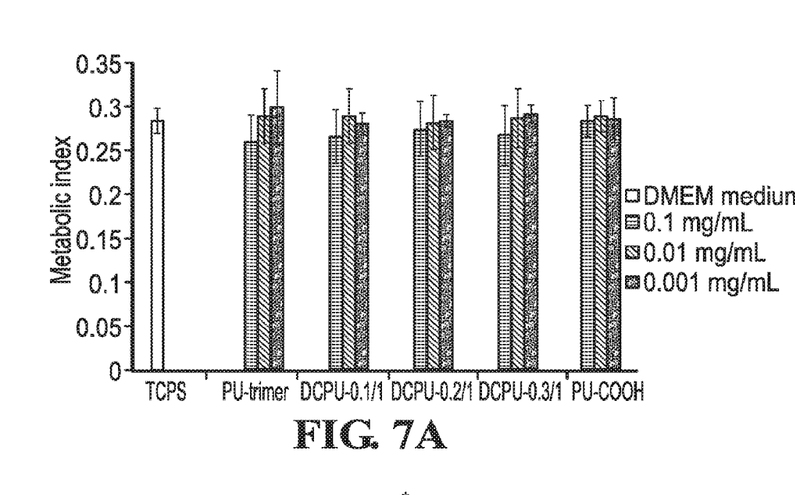
FIG. 7A shows cytotoxicity and cytocompatibility of the DCPU of FIG. 1B with metabolic index of mouse 3T3 fibroblasts cultured with DMEM medium mixed with DCPU degradation products at concentrations of 1, 0.1, 0.01 and 0.001 mg mL$^1$.
Figure 7B:
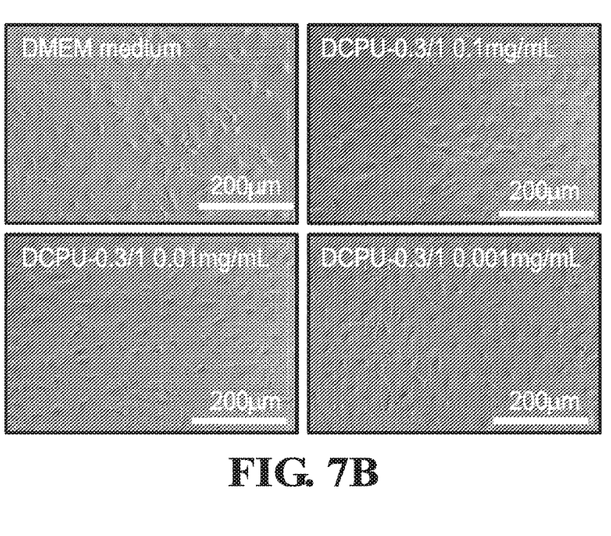
FIG. 7B shows cytotoxicity and cytocompatibility of the DCPU film of FIG. 1B with optical microscopy images of mouse 3T3 fibroblasts cultured with DMEM medium mixed with DCPU-0.3/1 degradation products at concentrations of 0.1, 0.01 and 0.001 mg mL$^1$. DMEM medium was used as the control.
Figure 7C:
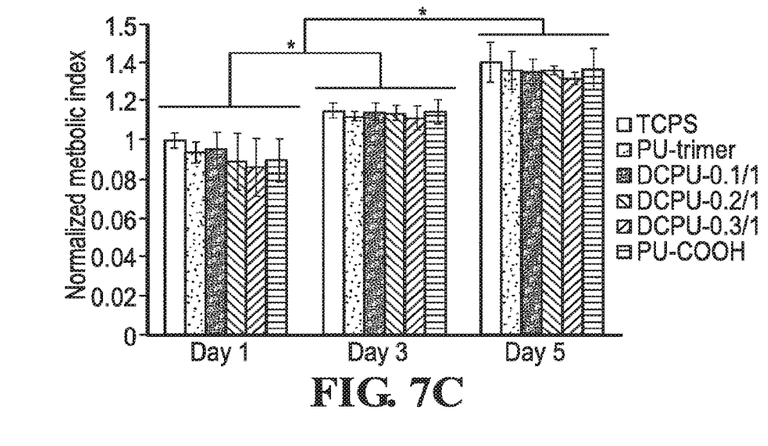
FIG. 7C shows cytotoxicity and cytocompatibility of the DCPU film of FIG. 1B with metabolic index of mouse 3T3 fibroblasts seeded on polyurethane films (TCPS as a control) at days 1, 3 and 5.
Figure 7D:
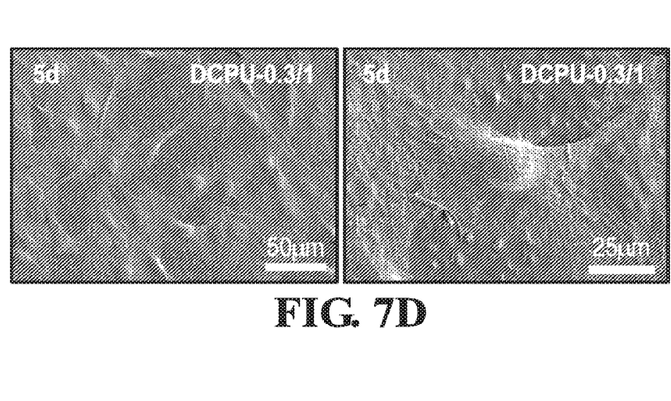
FIG. 7D shows cytotoxicity and cytocompatibility of the DCPU film of FIG. 1B with scanning electron micrographs of mouse 3T3 fibroblasts cultured on the DCPU-0.3/1 film at day 5 (500× and 1000× magnification).

Regarding the cytocompatibility of DCPU films (FIG. 7C), the 3T3 fibroblasts proliferated on both DCPU film surfaces and TCPS from 1 to 5 days (p<0.05) with no significant difference between the polymer films and TCPS during 5 days of incubation (p>0.05). The cell morphologies on the DCPU films were visualized by scanning electronic microscope (SEM; FIG. 7D and Supplementary FIG. S2 online). The cells spread on the polymer films and formed a confluent layer covering the surface of the DCPU films. The magnified SEM image of the single-cell spread on DCPU-0.3/1 film with clear pseudopods is shown in FIG. 3D. The results indicate the good cytocompatibility of DCPU films. We are aware that 3T3 fibroblasts are robust clonal cell line and may have higher tolerance of material toxicity. Future studies should be carried out using specialized and perhaps primary cells to better assess the potential tissue- and cell-specific toxicity of DCPU polymers.

Fabrication and Characterization of Porous DCPU Scaffold

Figure 8A:
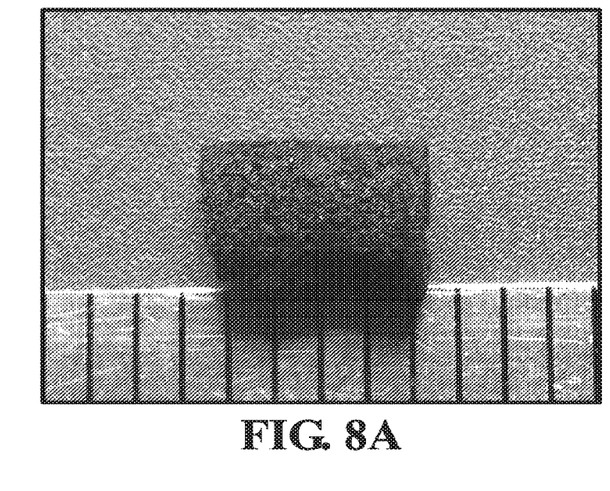
FIG. 8A shows porous DCPU scaffold with digital image.
Figure 8B:
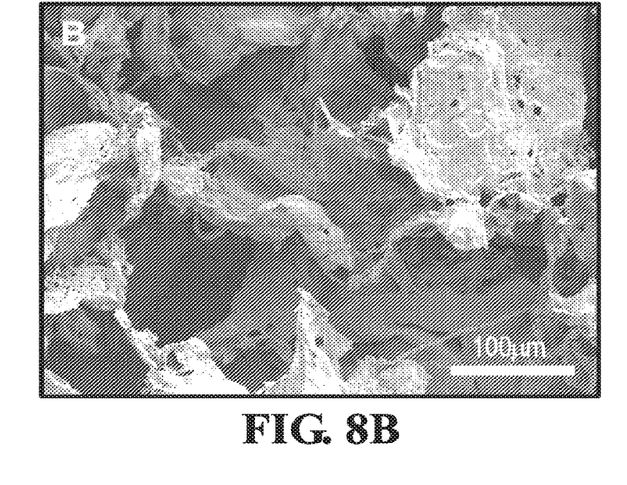
FIG. 8B shows SEM image of porous DCPU-0.3/1 scaffold fabricated by salt leaching.

DCPU can be processed into porous scaffolds using the salt leaching technique (FIG. 8A), which is a convenient way to obtain porous scaffolds with controllable pore size and porosity[31, 46]. The morphology of DCPU porous scaffolds was observed by SEM (FIG. 8B). The salt particle shaped pores were obvious and interconnected. The pore size and porosity of the DCPU scaffolds were 116±25 μm and 86±4%, respectively. Their elasticity and flexibility is shown in Supplementary Video S1 online. The poor processability of conventional conductive polymers has limited their biomedical applications due to their poor solubility and flexibility[17]. A conductive polyurethane with aniline pentamer had to be a diffusive additive to blend with PCL to form a film and a porous scaffold because of the poor solubility of this conductive polyurethane, and it still required mixing with a dopant[31, 32]. However, DCPU as a single-component conductive polymer can be processed into porous conductive scaffolds with flexibility and elasticity without adding extra additives and dopants. This unique property may facilitate the preparation of scaffolds with good material stability and controllability.

In Vivo Mouse Subcutaneous Implantation

Figure 9:
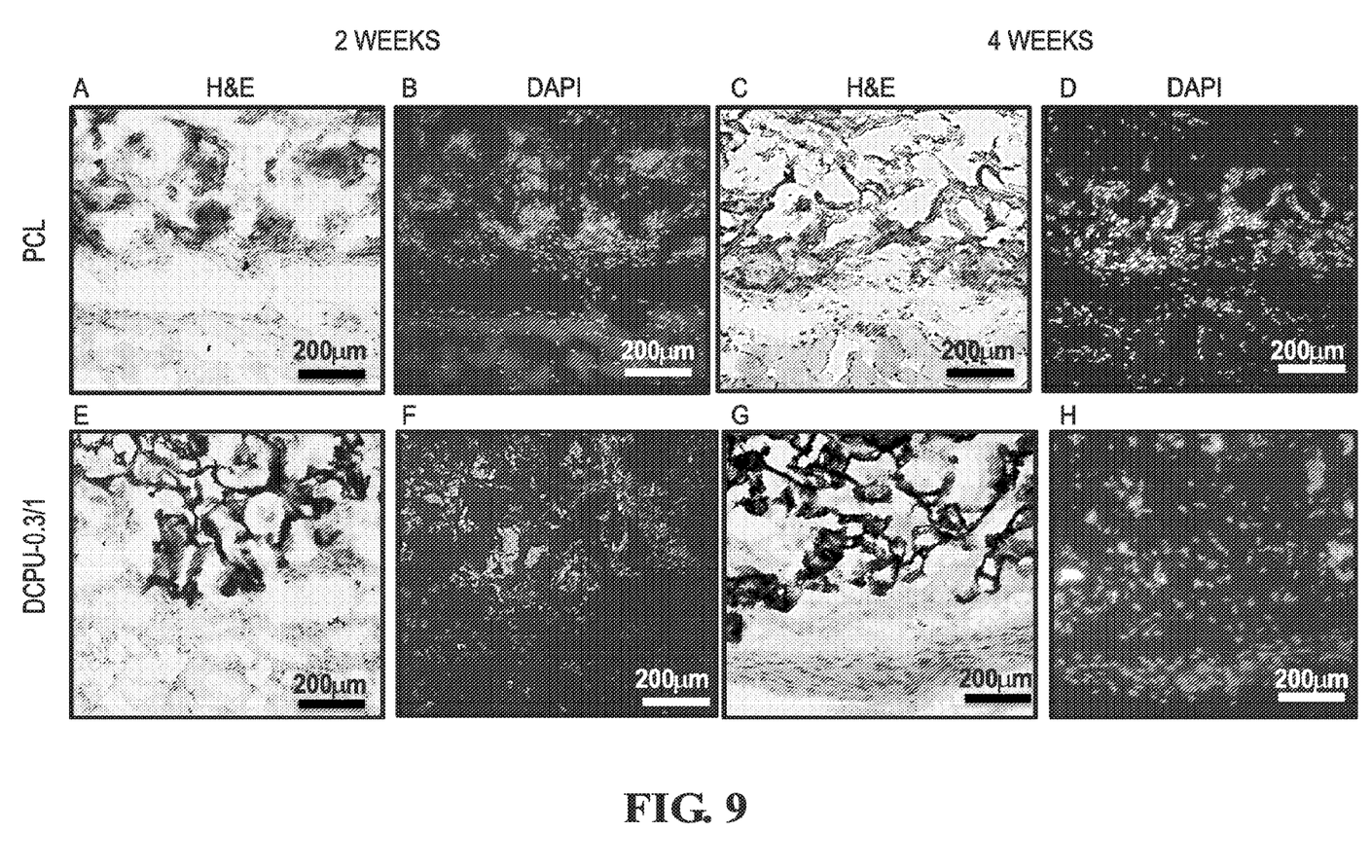
FIG. 9 shows in vivo biocompatibility of DCPU porous scaffolds in a mouse subcutaneous model. H&E (A, C, E and G) and DAPI (B, D, F and H) staining of the tissue surrounding PCL (A-D) and DCPU-0.3/1 (E-H) porous scaffolds which were implanted for 2 weeks (A, B, E and F) and 4 weeks (C, D, G and H). PCL scaffolds were used as a positive control.

In vivo tissue compatibility of DCPU porous scaffold was evaluated utilizing subcutaneous implantation in mice model for 2 and 4 weeks. Porous scaffold fabricated using PCL, which has excellent tissue biocompatibility and has been used in fabrication of FDA-approved devices, was chosen as a positive control[47-51]. The implants and surrounding tissues were stained with H&E and DAPI (nuclei) staining to reflect the extent of tissue compatibility and cell infiltration, respectively (FIG. 9A-H). H&E staining showed that tissue responses to DCPU scaffolds were comparable to those to PCL scaffolds and only small number of inflammatory cells were found at the interface between tissue and both scaffolds at Week 2 (FIG. 9A vs. E) and Week 4 (FIG. 9C vs. 9G). Similarly, we found that both PCL scaffolds and DCPU scaffolds were infiltrated with large number of host cells (stained with DAPI) after implantation for 2 weeks (FIG. 9B vs. 9F) and 4 weeks (FIG. 9D vs. 9H). The in vivo results support that DCPU scaffolds have good tissue/cells compatibility while facilitating cell infiltration at the extent similar to PCL scaffolds. Our results support that DCPU possesses excellent cell and tissue compatibility suitable for the fabrication of a variety of tissue engineering scaffolds, medical implants and bioelectronics.

As described herein, a biodegradable dopant-free conductive polymer with good elasticity and flexibility was synthesized. Compared to existing biodegradable conductive materials, DCPU is a single-component biodegradable elastomer with good electroactivity and electric stability and processability. It also exhibits good cytocompatibility and in vivo biocompatibility. The DCPUs have utility in tissue repair and regeneration, and other biomedical-related applications. The methodology disclosed herein can also be utilized to develop serials of novel dopant-free conductive polymers disclosed herein.

EXAMPLES

Chemical Reagents

PCL (average number molecular weight=2000, Sigma) was dried in a vacuum oven at 60° C. to remove residual water before synthesis. HDI (Sigma) and putrescine (Sigma) were purified by distillation before use. DMPA (Sigma), stannous octoate [Sn(Oct)$_2$, Sigma], 4-fluoronitrobenzene (Sigma), p-phenylenediamine (Sigma), triethylamine (TEA, Sigma), tin granular (Sigma), ammonium persulfate (Sigma), hydrochloric acid (HCl, Sigma), sodium hydroxide (NaOH, Sigma), CSA (Sigma), anhydrous dimethyl sulfoxide (DMSO, Sigma), acetone (Sigma), 1,1,1,3,3,3,3-hexafluoroisopropanol (HFIP, Oakwood Product), hexamethyldisilazane (HMDS, Sigma) and lipase from *Thermomyces lanuginosus* (≥100,000 U/g, Sigma) were used as received.

Example 1 Synthesis of Oxidized Aniline Trimer with Two Amine End Groups

All chemicals were purchased from Sigma-Aldrich. A round-bottomed flask equipped with a magnetic stirrer and an argon inlet was charged with p-phenylenediamine (1.54 g), 4-fluoronitrobenzene (5.06 g), and triethylamine (2.88 g) in anhydrous dimethyl sulfoxide (DMSO). The reaction lasted 3 days at 125° C., then was cooled to room temperature, followed by the addition of concentrated HCl, then a red precipitate was formed. The collected red precipitate was subsequently dissolved in concentrated HCl along with granulated tin prior to refluxing for 5 h. A whitish-blue solid was further collected after the addition of concentrated HCl and 5 M NaOH. The solid was then dissolved in ethanol/acetone (1/1, v/v) and 1 M HCl completely, followed by the addition of ammonium persulfate (1.98 g), and stirred in a cold bath for 10 min. The formed blue precipitate was then filtered, washed with an excess amount of distilled water, and dried overnight for the collection of pure oxidized aniline trimer (2.31 g, dark-blue solid). Chemical structure characterization of the oxidized aniline trimer, possessing two $NH_2$ end groups, is as follows: $^1$H NMR (500 MHz, DMSO-$d_6$, δ): 5.43 (s, 4H), 6.60-6.79 (m, 4H), 6.89-7.05 (m, 4H). $^{13}$C NMR (125 MHz, $CDCl_3$, δ): 114.0, 123.0, 124.1, 124.3, 135.2, 136.8, 139.2, 139.3, 147.6, 147.8, 155.1. IR (neat): 3379, 3309, 3206, 1630, 1542, 1318, 1166, 984, 830, 699, 541, 506, 411 $cm^{-1}$. HRMS (ESI) m/z calcd for $C_{18}H_{17}N_4^+$ $(M+H)^+$ 289.1448; found, 289.1443.

Example 2 Synthesis of DCPU

The conductive polyurethanes were synthesized from PCL, DMPA, HDI, and a chain extender aniline trimer. PCL and DMPA were dissolved in DMSO at 70° C. in a three-neck flask under $N_2$ protection with stirring, followed by the addition of HDI and 3 drops of catalyst $Sn(Oct)_2$. After 3 h of reaction, the prepolymer solution was cooled to room temperature. The aniline trimer/DMSO solution was added dropwise into the pre-polymer solution. The reaction then continued for 18 h at room temperature. The resulting polymer was precipitated in distilled water, washed by ethanol, and then dried in a vacuum oven at 60° C. for 3 days. The molar ratios of PCL:DMPA:HDI:trimer were set such that x:y:(n+m):z in the shortened formula of the resulting DCPUs were 1:0:2:1, 0.9:0.1:2:1, 0.8:0.2:2:1, and 0.7:0.3:2:1, which were referred to as PU-trimer, DCPU-0.1/1, DCPU-0.2/1, and DCPU-0.3/1, respectively. Polyurethane with a chain extender putrescine (PU—COOH) was used as a control. The molar ratio of PCL:DMPA:HDI putrescine was 0.7:0.3:2:1. The yields of all final products were above 85%.

Example 3 Fabrication of DCPU Films

The synthesized DCPU polymers were dissolved in HFIP at a concentration of 2% (wt/v), followed by pouring into a Teflon dish. After the complete evaporation of HFIP, the conductive polymer films were dried in a vacuum oven at 60° C. for 3 days.

Example 4 Polymer Characterization

FTIR spectra were obtained using a Nicolet 6700 spectrometer (Thermo Scientific, Germany) to verify the chemical structure of DCPU. Thermal properties were characterized by a differential scanning calorimeter (DSC, Shimazu DSC-60) at a scanning rate of 10° C. $min^{-1}$ ranging from −100 to 200° C. with a nitrogen flow. UV-visible spectra of DCPU solutions in DMSO were recorded on a UV-vis spectrometer (PerkinElmer, Lambda 35). For water absorption, the weighted polymer films ($W_0$) were incubated in a phosphate buffer solution (PBS, Sigma) at 37° C. The films were weighted ($W_1$) after removing surface water using filter paper. The water absorption was calculated using equation (1):

$$\text{Water absorption (\%)} = \frac{W_1 - W_0}{W_0} \times 100\% \qquad (1)$$

Three parallel samples were tested for each group. The polymer inherent viscosity (IV) associated with molecular weight was measured using an Ubbelohde viscometer[52]. Each sample was dissolved in 15 mL HFIP at a concentration of 0.1 g $dL^{-1}$ and then filtered by a 1.2 μm glass-fiber filter. Each sample was tested five times at room temperature. The IV was calculated using equation (2):

$$IV = \frac{\ln\left(\frac{t_p}{t_s}\right)}{C_P} \qquad (2)$$

$\ln(t_p/t_s)/C_p$, where $t_p$ is the time for the polymer solution flowing through the capillary; $t_s$ is the time for the solvent HFIP flowing through the capillary; and $C_p$ is the polymer concentration.

Example 5 Electrical Conductivity and Electrochemical Measurements

The electrical conductivity (σ, S $cm^{-1}$) of the DCPU films was measured using the four-point probe technique at both dry and wet states at room temperature[43,53]. A direct current (DC) was supplied to pass through the outer probes, and voltage was induced in the inner two probes. The four-point probe was homemade, and the instrument for current supply and voltage measurement was a PARSTAT 2273 potentiostat. The electrical conductivities of the samples were calculated by equation (3):

$$\sigma = (\ln 2/\pi)(1/V)(1/t) \qquad (3)$$

where σ represents the electrical conductivity; I is the current in ampere; V is the voltage in volts; and t is the sample thickness in cm. Four measurements were taken for each group.

The electrochemical properties of DCPU were assessed by cyclic voltammetric (CV) analysis using the same potentiostat instrument (PARSTAT 2273) as above[26]. A three-electrode system was involved, consisting of a platinum working sheet electrode coated with the conductive polymer, a platinum-mesh auxiliary electrode, and an Ag/AgCl reference electrode. The CV was recorded at a scan rate of 50 mV s$^{-1}$ in 1 M H$_2$SO$_4$ solution with scanning potential between −1 and 1.3 V.

Example 6 Mechanical Testing

The mechanical properties of the samples (2×20 mm strips; n=5) were measured on an MTS Insight Testing System with a 500-N load cell and a crosshead rate of 10 mm min$^{-1}$ according to ASTM D638-03[54]. For conductivity-strain measurements, DCPU films (n=3) were stretched in the uniaxial direction at room temperature, and then their electrical conductivities at 30%, 70%, and 100% strains were measured using the four-point probe technique, as described above. The instant strain recovery was measured under the same conditions as described above. Two distal ends of the samples were marked, and the samples were stretched to 10% strain, held for 1 min, and released. This stretch cycle was repeated three times. The original length ($L_0$) and the length after stretching ($L_1$) were measured using a caliper. The instant strain recovery was calculated using equation (4):

$$\text{Instant recovery (\%)} = \left(1 - \frac{L_1 - L_0}{L_0}\right) \times 100\% \quad (4)$$

Cyclic stretch testing was conducted by stretching the strips (2×20 mm; n=3) to a maximum strain of 30% or 300%, respectively, and then releasing them back to 0% strain. The stretch cycle was repeated 10 times at a rate of 10 mm min$^{-1}$[47].

Example 7 Polymer Degradation

To study the in vitro hydrolytic and enzymatic degradation profile of synthesized polymers, the weighted samples ($W_0$) were immersed in 10 mL PBS or in 2 mL of PBS containing 100 U mL$^{-1}$ lipase solution at 37° C.[55]. The lipase/PBS solution was changed every 3 days. At a predetermined time point, the samples were rinsed three times with deionized water, dried in a freeze-dryer for 3 days, and then weighed ($W_1$). The mass remaining was calculated by equation (5) below. Three parallel samples were used for each group at each time point.

$$\text{Mass remaining (\%)} = \frac{W_1}{W_0} \times 100\% \quad (5)$$

The mechanical properties of the DCPU films (n=4) after enzymatic degradation were measured as described above.

Example 8 Electrical Stability of DCPU Films

The conductivity changes of the DCPU films (n=3) were recorded in 100 U mL$^{-1}$ lipase/PBS solution after 7 and 14 days of degradation at 37° C. At each time point, the degraded DCPU films were taken out and rinsed by PBS to remove the attached enzymes on the film surface. Their conductivities in the wet state were then measured by the four-probe technique, as described above. The electrical stability of the DCPU film was measured in a cell culture medium (Eagle's medium containing 0.05% sodium azide to prevent bacterial growth) under a constant DC voltage of 100±2 mV provided by a PARSTAT 2273 potentiostat[18]. The incubation lasted for 150 h at 37° C. The measurement was undertaken in triplicate. PU-trimer doped with CSA (the molar ratio of CSA:aniline trimer was set as 1.5:1) during the film fabrication process as described above was used as a control group. Conductivity changes during enzymatic degradation and electrical stability of the control group (PU-trimer doped with CSA) were measured via the same processes as those of the DCPU films.

Example 9 Cytotoxicity of DCPU Degradation Products

The DCPU polymers (100 mg) were placed in 1 M NaOH solution at 37° C. for 1 week to achieve complete degradation[56]. The degradation solution was neutralized using 10 M HCl solution to pH=7 and sterilized by a 0.22 μm membrane filter. Mouse 3T3 fibroblasts (ATCC, Manassas, Va.) were seeded in 24-well cell culture plates at a density of 1.6×10$^4$ cells per well in cell culture medium of Dulbecco's modified Eagle's medium (DMEM), which was supplemented with 10% fetal bovine serum, 100 U mL$^{-1}$ penicillin, and 100 μg mL$^{-1}$ streptomycin. After 1 day of incubation, the neutralized degradation solution diluted by the DMEM medium at a final concentration of 0.1, 0.01, and 0.001 mg mL$^{-1}$ was then added to each well. The DMEM medium was used as the control group. After 24 h cell culture, the cell viability (n=4) was measured using a mitochondrial activity assay (MTT, Sigma), and an optical microscope was used to observe cell morphology.

Example 10 In Vitro Biocompatibility of Polymer Films

The polymer films were punched into 6 mm diameter disks using standard biopsy punches (6 mm, Miltex) and sterilized using 70% ethanol solution and UV irradiation for 30 min each, and then they were rinsed by PBS three times. Prior to cell seeding, the sterilized disks were placed in a cell culture medium overnight. Mouse 3T3 fibroblasts were seeded on the sample surface with a seeding density of 3×10$^3$ per well in 96-well plates. The cell medium was exchanged every 2 days. The MTT assay was used to evaluate the cellular activity (n=4) at 1, 3, and 5 days. The tissue culture polystyrene (TCPS) was used as a positive control. To qualitatively verify the MTT results and visualize the 3T3 fibroblasts on the films, the cell-seeded films at 1 and 5 days were fixed in 4% paraformaldehyde and dehydrated in graded ethanol solutions (30%, 50%, 70%, 80%, 90%, 95%, and 100%), treated with HMDS, and dried at room temperature. The treated films were observed under SEM (Hitachi S-4800 HRSEM) to visualize the cell morphologies on polymer films.

Example 11 Porous Scaffold Fabrication and Characterization

For porous scaffold fabrication, the DCPU-0.3/1 polymer was completely dissolved in HFIP at a concentration of 6% (wt/v). Salt particles (NaCl, Sigma) with sizes ranging from 100 to 150 μm were obtained by American standard sieves. The salt particles (5 g) were uniformly mixed with 1 mL of DCPU/HFIP solution. The DCPU/salt mixture was then placed in a cylinder glass mold and exposed to the air for HFIP evaporation. After complete HFIP evaporation, the scaffold was immersed in DI water for 3 days to remove salt particles. The porous scaffold was eventually obtained after lyophilization for 3 days. The morphology of the porous scaffold was observed under SEM. The scaffold porosity was measured by ethanol displacement[57]. The scaffold sample was immersed in a measurement cylinder containing a known volume of pure ethanol ($V_1$). After 5 min, the total volume of ethanol and ethanol-impregnated scaffold was recorded as $V_2$. After removing the ethanol-impregnated scaffold from the cylinder, the residual ethanol volume was recorded as $V_3$. The scaffold porosity was calculated by equation (6):

$$\text{Porosity} = \frac{V_1 - V_3}{V_2 - V_3} \qquad (6)$$

Example 12 Mouse Subcutaneous Implantation Model

In vivo study was carried out in accordance with National Institutes of Health (NIH) guidelines for animal care and was approved by the Institutional Animal Care and Use Committee of the University of Texas at Arlington. Female Balb/C mice (20-25 grams, purchased from Taconic Farms, Germantown, N.Y.) were utilized for this study. Porous scaffolds made from DCPU-0.3/1 and PCL (a positive control, average Mn=80,000, Sigma) (4 mm diameter×2 mm thickness) were implanted subcutaneously on the back of animals. After implantation for 2 and 4 weeks, these mice were sacrificed, and then the implants along with their surrounding tissues were collected and frozen in OCT. For histological analysis of tissue compatibility, 8-μm sections from frozen samples were made using Leica Cryostat (CM1850, Leica 247 Microsystem, Wetzlar, Germany), followed by staining with hematoxylin-eosin (H&E). In addition, 4,6-diamidino-2-phenylindole (DAPI) staining was also performed to assess the extent of cell infiltration in DCPU and PCL porous scaffolds.

Statistical Analysis

All results are presented as mean±standard deviation. All data were analyzed by one-way ANOVA followed by a post-hoc Tukey-Kramer test. Repeated-measure ANOVA was used for hydrolytic and enzymatic degradation of conductive polymer films using Statistical Analysis System (SAS). $p<0.05$ was considered a significant difference.

The following references, to the extent that they provide exemplary procedural or other details supplementary to those set forth above, are specifically incorporated by reference.

1. Guimard, N. K., Gomez, N. & Schmidt, C. E. Conducting polymers in biomedical engineering. *Prog. Polym. Sci.* 32, 876-921 (2007).
2. Huang, L. et al. Synthesis and characterization of electroactive and biodegradable ABA block copolymer of polylactide and aniline pentamer. *Biomaterials* 28, 1741-1751 (2007).
3. Chen, M. C., Sun, Y. C. & Chen, Y. H. Electrically conductive nanofibers with highly oriented structures and their potential application in skeletal muscle tissue engineering. *Acta Biomater* 9, 5562-5572 (2013).
4. Dvir, T. et al. Nanowired three-dimensional cardiac patches. *Nat. Nanotechnol.* 6, 720-725 (2011).
5. Hirata, E. et al. Multiwalled carbon nanotube-coating of 3D collagen scaffolds for bone tissue engineering. *Carbon* 49, 3284-3291 (2011).
6. Durgam, H. et al. Novel degradable co-polymers of polypyrrole support cell proliferation and enhance neurite out-growth with electrical stimulation. *J. Biomater. Sci. Polym. Ed* 21, 1265-1282 (2010).
7. Hardy, J. G. et al. Biodegradable electroactive polymers for electrochemically-triggered drug delivery. *J. Mater. Chem. B* 2, 6809-6822 (2014).
8. Ge, J., Neofytou, E., Cahill I I I, T. J., Beygui, R. E. & Zare, R. N. Drug release from electric-field-responsive nanoparticles. *ACS Nano* 6, 227-233 (2011).
9. Li, C., Adamcik, J. & Mezzenga, R. Biodegradable nanocomposites of amyloid fibrils and graphene with shape-memory and enzyme-sensing properties. *Nat. Nanotechnol.* 7, 421-427 (2012).
10. Xiao, Y., Zhou, S., Wang, L. & Gong, T. Electro-active shape memory properties of poly (ε-caprolactone)/functionalized multiwalled carbon nanotube nanocomposite. *ACS Appl. Mater. Interfaces* 2, 3506-3514 (2010).
11. Jiang, S. et al. Highly Stretchable Conductive fibers from few-walled carbon nanotubes coated on poly (m-phenylene isophthalamide) polymer core/shell structures. *ACS Nano* 9, 10252-10257 (2015).
12. Li, P., Sun, K. & Ouyang, J. Stretchable and Conductive polymer films prepared by solution blending. *ACS Appl. Mater. Interfaces* 7, 18415-18423 (2015).
13. Ma, R., Kang, B., Cho, S., Choi, M. & Baik, S. Extraordinarily high conductivity of stretchable fibers of polyurethane and silver nanoflowers. *ACS Nano* 9, 10876-10886 (2015).
14. Nguyen, H. T. et al. Electric field stimulation through a biodegradable polypyrrole-co-polycaprolactone substrate enhances neural cell growth. *J. Biomed. Mater. Res., A* 102, 2554-2564 (2014).
15. Xie, M. et al. Ductile electroactive biodegradable hyperbranched polylactide copolymers enhancing myoblast differentiation. *Biomaterials* 71, 158-167 (2015).
16. Kaynak, A., Rintoul, L. & George, G. A. Change of mechanical and electrical properties of polypyrrole films with dopant concentration and oxidative aging. *Mater. Res. Bull.* 35, 813-824 (2000).
17. Balint, R., Cassidy, N. J. & Cartmell, S. H. Conductive polymers: Towards a smart biomaterial for tissue engineering. *Acta Biomater.* 10, 2341-2353 (2014).
18. Shi, G., Rouabhia, M., Wang, Z., Dao, L. H. & Zhang, Z. A novel electrically conductive and biodegradable composite made of polypyrrole nanoparticles and polylactide. *Biomaterials* 25, 2477-2488 (2004).
19. Baek, S., Green, R. A. & Poole-Warren, L. A. Effects of dopants on the biomechanical properties of conducting polymer films on platinum electrodes. *J. Biomed. Mater. Res. A* 102, 2743-2754 (2014).
20. Guilak, F., Butler, D. L., Goldstein, S. A. & Baaijens, F. P. Biomechanics and mechanobiology in functional tissue engineering. *J. Biomech* 47, 1933-1940 (2014).
21. Xu, C. et al. Synthesis and characterization of conductive, biodegradable, elastomeric polyurethanes for biomedical applications. *J. Biomed. Mater. Res. A* 104, 2305-2314 (2016).
22. Green, R. A., et al. Conductive hydrogels: mechanically robust hybrids for use as biomaterials. *Macromol. Biosci.* 12, 494-501 (2012).
23. Green R A, Poole-Warren L A, Baek S, Martens P J, inventors; Newsouth Innovations Pty Limited, assignee. Polymeric material. United States patent US20120100217 A1. 2012 Apr. 26.
24. Delpech, M. C. & Miranda, G. S. Waterborne polyurethanes: influence of chain extender in ftir spectra profiles. *Cent Eur J Eng.* 2, 231-238 (2012).

25. Tang, J., Jing, X., Wang, B. & Wang, F. Infrared spectra of soluble polyaniline. *Synth. Met.* 24, 231-238 (1988).
26. Gharibi, R., Yeganeh, H., Gholami, H. & Hassan, Z. M. Aniline tetramer embedded polyurethane/siloxane membranes and their corresponding nanosilver composites as intelligent wound dressing materials. *RSC Adv* 4, 62046-62060 (2014).
27. Guo, Y. et al. Electroactive oligoaniline-containing self-assembled monolayers for tissue engineering applications. *Biomacromolecules* 8, 3025-3034 (2007).
28. Wan, M. Absorption spectra of thin film of polyaniline. *Polym. Sci., Part A: Polym. Chem.* 30, 543-549 (1992).
29. Chiolerio, A., Bocchini, S. & Porro, S. Inkjet Printed negative supercapacitors: synthesis of polyaniline-based inks, doping agent effect, and advanced electronic devices applications. *Adv. Funct. Mater.* 24, 3375-3383 (2014).
30. Mawad, D. et al. An erodible polythiophene-based composite for biomedical applications. *J. Mater. Chem.* 21, 5555-5560 (2011).
31. Baheiraei, N. et al. Preparation of a porous conductive scaffold from aniline pentamer-modified polyurethane/PCL blend for cardiac tissue engineering. *J. Biomed. Mater. Res. A* 103, 3179-3187 (2015).
32. Baheiraei, N. et al. Synthesis, characterization and antioxidant activity of a novel electroactive and biodegradable polyurethane for cardiac tissue engineering application. *Mater. Sci. Eng., C* 44, 24-37 (2014).
33. Kai, D., Prabhakaran, M. P., Jin, G., & Ramakrishna, S. Polypyrrole-contained electrospun conductive nanofibrous membranes for cardiac tissue engineering. *J. Biomed. Mater. Res. A* 99, 376-385 (2011).
34. Zhou, J. et al. Engineering the heart: evaluation of conductive nanomaterials for improving implant integration and cardiac function. *Sci. Rep.* 4, 3733 (2014).
35. Qi, F. et al. Electrical regulation of olfactory ensheathing cells using conductive polypyrrole/chitosan polymers. *Biomaterials* 34, 1799-1809 (2013).
36. Niple, J., Daigle, J., Zaffanella, L., Sullivan, T. & Kavet, R. A portable meter for measuring low frequency currents in the human body. *Bioelectromagnetics* 25, 369-373 (2004).
37. Rivers, T. J., Hudson, T. W. & Schmidt, C. E. Synthesis of a novel, biodegradable electrically conducting polymer for biomedical applications. *Adv. Funct. Mater.* 12, 33-37 (2002).
38. Lee, J. W., Serna, F., Nickels, J. & Schmidt, C. E. Carboxylic acid-functionalized conductive polypyrrole as a bioactive platform for cell adhesion. *Biomacromolecules* 7, 1692-1695 (2006).
39. Xiao, H. M. et al. Large enhancement in conductivity of polyaniline films by cold stretching. *Macromol. Chem. Phys.* 211, 1109-1116 (2010).
40. Loh, X. J., Tan, K. K., Li, X. & Li, J. The in vitro hydrolysis of poly (ester urethanes) consisting of poly [(R)-3-hydroxybutyrate] and poly (ethylene glycol). *Biomaterials* 27, 1841-1850 (2006).
41. Lyu, S. & Untereker, D. Degradability of polymers for implantable biomedical devices. *Int. J Mol. Sci.* 10, 4033-4065 (2009).
42. Heijkants, R. G. J. C. Polyurethane scaffolds as meniscus reconstruction materials. Ph.D. Dissertation (University Library Groningen, 2004).
43. Qazi, T. H. et al. Development and characterization of novel electrically conductive PANI-PGS composites for cardiac tissue engineering applications. *Acta Biomater* 10, 2434-2445 (2014).
44. Kagawa, Y., Takaoka, T., Hamamoto, T. & Ohta, T. Cytosol type electrolyte medium suitable for long term growth of human cells with very low membrane potential. *Biochem Biophys Res Commun.* 169, 1217-1221 (1990).
45. Wang, Z. et al. A biodegradable electrical bioconductor made of polypyrrole nanoparticle/poly (D, L-lactide) composite: A preliminary in vitro biostability study. *J. Biomed. Mater. Res. A* 66, 738-746 (2003).
46. Hong, Y. et al. Tailoring the degradation kinetics of poly (ester carbonate urethane) urea thermoplastic elastomers for tissue engineering scaffolds. *Biomaterials* 31, 4249-4258 (2010).
47. Xu, C., Huang, Y., Wu, J., Tang, L. & Hong, Y. Triggerable degradation of polyurethanes for tissue engineering applications. *ACS Appl. Mater. Interfaces* 7, 20377-20388 (2015).
48. Byers, B. A., Guldberg, R. E., Hutmacher, D. W. & Garcia, A. J. Effects of Runx2 genetic engineering and in vitro maturation of tissue-engineered constructs on the repair of critical size bone defects. *J. Biomed. Mater. Res. A.* 76, 646-655 (2006).
49. Lam, C. X., Hutmacher, D. W., Schantz, J. T., Woodruff, M. A. & Teoh, S. H. Evaluation of polycaprolactone scaffold degradation for 6 months in vitro and in vivo. *J. Biomed. Mater. Res., A.* 90, 906-919 (2009).
50. Schantz, J. T. et al. Application of an X-ray microscopy technique to evaluate tissue-engineered bone-scaffold constructs. *Mater. Sci. Eng. C* 20, 9-17 (2002).
51. Seyednejad, H. et al. In vivo biocompatibility and biodegradation of 3D-printed porous scaffolds based on a hydroxyl-functionalized poly(e-caprolactone). *Biomaterials* 33, 4309-4318 (2012).
52. Asplund, J. B., Bowden, T., Mathisen, T. r. & Hilborn, J. n. Synthesis of highly elastic biodegradable poly (urethane urea). *Biomacromolecules* 8, 905-911 (2007).
53. Smits, F. Measurement of sheet resistivities with the four-point probe. *Bell Syst. Tech. J.* 37, 711-718 (1958).
54. Chuang, T. W. & Masters, K. S. Regulation of polyurethane hemocompatibility and endothelialization by tethered hyaluronic acid oligosaccharides. *Biomaterials* 30, 5341-5351 (2009).
55. Ma, Z. et al. Biodegradable polyurethane ureas with variable polyester or polycarbonate soft segments: Effects of crystallinity, molecular weight, and composition on mechanical properties. *Biomacromolecules* 12, 3265-3274 (2011).
56. Zhou, L. et al. Synthesis and characterization of pH-sensitive biodegradable polyurethane for potential drug delivery applications. *Macromolecules* 44, 857-864 (2011).
57. Hsu, Y. Y. et al. Effect of polymer foam morphology and density on kinetics of in vitro controlled release of isoniazid from compressed foam matrices. *J. Biomed. Mater. Res* 35, 107-116 (1997).

What is claimed is:

1. A dopant free conductive polyurethane elastomer (DCPU) comprising polymeric diol (PD), diisocyanate (DI), bishydroxy acid (BHA), and aniline oligomer (AO) having a formula of wherein PD represents a reaction residue of the polymeric diol, excluding the terminal hydroxyl groups of the polymeric diol:

wherein DI represents a reaction residue of the diisocyanate, excluding the terminal isocyanate groups of the diisocyanate;

wherein BHA represents a reaction residue of the bishydroxy acid, excluding the terminal hydroxyl groups of the bishydroxy acid;

AO represents a reaction residue of the aniline oligomer, excluding the terminal amine groups of the aniline oligomer; and wherein the ratio between x:y:(n+m):z is in the range of 1.9:0.1:4:1 and 1:1:4:1.

2. The elastomer of claim 1, wherein said polymeric diol is selected from polycaprolactone (PCL), poly (trimethylene carbonate) (PTMC), poly (hexamethylene carbonate), poly (lactide- co-caprolactone) (PLC), poly (δ-valerolactone-co-caprolactone) (PVCL), and poly ethylene glycol (PEG) containing triblock copolymer diols of PCL-PEG-PCL, PTMC-PEG-PTMC, PVCL-PEG-PVCL, or PLC-PEG-PCL.

3. The elastomer of claim 1, wherein said aniline oligomers is selected from the group consisting of aniline trimer, aniline tetramer, aniline pentamer, aniline hexamer, aniline heptamer, and aniline octamer.

4. The elastomer of claim 1, wherein said diisocyanate is selected from the group consisting of butane diisocyanate (BDI), hexamethylene diisocyanate (HDI), and L-lysine diisocyanate.

5. The elastomer of claim 1, wherein said bishydroxy acid is selected from dimethylolpropionic acid (DMPA) and 2,2-Bis (hydroxymethyl)butyric acid.

6. The elastomer of claim 1, wherein the ratio between x:y:(n+m):z is in the range of 1.8:0.2:4:1 and 1.4:0.6:4:1.

7. The elastomer of claim 1, having a conductivity of at least $10^{-5}$ to $10^{-3}$ S/cm.

8. The elastomer of claim 1, wherein the conductivity of the elastomer does not change significantly after 14 days enzymatic degradation, or with electronic charge for 150 h.

9. The elastomer of claim 1, wherein the elastomer has more than 99% instant elastic recovery after at least 3 to 10 cycles stretching at 10% strain.

10. The elastomer of claim 1, wherein the elastomer is biodegradable.

11. A dopant free conductive polyurethane elastomer (DCPU) comprising polycaprolactone diol (PCL), hexamethylene diisocyanate (HDI), dimethylolpropionic acid (DMPA), and aniline trimer (A3) having a formula of wherein PCL represents a reaction residue of polycaprolactone diol, excluding the terminal hydroxyl groups of the polycaprolactone diol;

wherein HDI represents a reaction residue of hexamethylene diisocyanate, excluding the terminal isocyanate groups of the hexamethylene diisocyanate;

wherein DMPA represents a reaction residue of dimethylolpropionic acid, excluding the terminal hydroxyl groups of the dimethylolpropionic acid;

wherein A3 represents a reaction residue of an aniline trimer, excluding the terminal amine groups of the aniline trimer; and wherein the ratio between x:y:(n+m):z is in the range of 1.8:0.2:4:1 and 1.4:0.6:4:1.

12. The elastomer of claim 10, having a conductivity of at least $10^{-5}$ to $10^{-3}$ S/cm and the conductivity of the elastomer does not change significantly after 14 days enzymatic degradation.

13. The elastomer of claim 10, wherein the elastomer has more than 99% instant elastic recovery after at least 3 to 10 cycles stretching at 10% strain.

14. A method for synthesizing a dopant free conductive polyurethane elastomer (DCPU) comprising polymeric diol (PD), diisocyanate (DI), bishydroxy acid (BHA), and aniline oligomer (AO) having a formula of the method comprising:
a. reacting the polymer diol (PD), the bishydroxy acid (BHA), and the diisocyanate (DI) to form a product mixture that comprises a PD containing diisocyanate and a BHA containing diisocyanate; and
b. reacting the product of step a with the aniline oligomer (AO) to form the dopant free conductive polyurethane elastomer,
wherein the amount of PD, BHA, DI, and AO used is adjusted such that the ratio between x:y:(n+m):z is in the range of 1.9:0.1:4:1 and 1:1:4:1.

15. The method of claim 14, wherein said polymeric diol is selected from polycaprolactone (PCL), poly (trimethylene carbonate) (PTMC), poly (hexamethylene carbonate), poly (lactide- co-caprolactone) (PLC), poly (δ-valerolactone-co-caprolactone) (PVCL), and poly ethylene glycol (PEG) containing triblock copolymer diols of PCL-PEG-PCL, PTMC-PEG-PTMC, PVCL-PEG-PVCL, or PLC-PEG-PCL.

16. The method of claim 14, wherein said aniline oligomers is selected from the group consisting of aniline trimer, aniline tetramer, aniline pentamer, aniline hexamer, aniline heptamer, and aniline octamer.

17. The method of claim 14, wherein said diisocyanate is selected from the group consisting of butane diisocyanate (BDI), hexamethylene diisocyanate (HDI), and L-lysine diisocyanate.

18. The method of claim 14, wherein said bishydroxy acid is selected from dimethylolpropionic acid (DMPA) and 2,2-Bis (hydroxymethyl)butyric acid.

19. The method of claim 14, wherein the polymer diol is polycaprolactone diol (PCL), the diisocyanate is hexamethylene diisocyanate (HDI), the aniline oligomer is aniline trimer (A3), and the bishydroxy acid is DMPA.

20. The method of claim 19, wherein the ratio between x:y:(n+m):z is in the range of 1.8:0.2:4:1 and 1.4:0.6:4:1.

* * * * *